United States Patent
Bundschuh et al.

(10) Patent No.: US 9,899,868 B2
(45) Date of Patent: Feb. 20, 2018

(54) SMART TRANSFER SWITCH DEVICES, SYSTEMS, AND METHODS USING DOUBLE-BASE BIPOLAR TRANSISTORS

(71) Applicant: Ideal Power Inc., Austin, TX (US)

(72) Inventors: Paul A. Bundschuh, Austin, TX (US); John W. Merritt, Austin, TX (US); William C. Alexander, Spicewood, TX (US)

(73) Assignee: Ideal Power, Inc., Austin, TX (US)

( * ) Notice: Subject to any disclaimer, the term of this patent is extended or adjusted under 35 U.S.C. 154(b) by 176 days.

(21) Appl. No.: 14/930,627

(22) Filed: Nov. 2, 2015

(65) Prior Publication Data

US 2016/0197517 A1    Jul. 7, 2016

Related U.S. Application Data

(60) Provisional application No. 62/073,809, filed on Oct. 31, 2014, provisional application No. 62/162,907, filed on May 18, 2015.

(51) Int. Cl.

| | |
|---|---|
| *H02J 9/06* | (2006.01) |
| *H02J 3/32* | (2006.01) |
| *H02J 3/38* | (2006.01) |
| *H02M 5/297* | (2006.01) |
| *H02M 7/48* | (2007.01) |
| *H02M 5/293* | (2006.01) |

(52) U.S. Cl.
CPC ............... *H02J 9/06* (2013.01); *H02J 3/32* (2013.01); *H02J 3/382* (2013.01); *H02M 5/297* (2013.01); *H02M 7/4807* (2013.01); *H02M 2005/2932* (2013.01); *Y02B 10/72* (2013.01); *Y02E 70/30* (2013.01)

(58) Field of Classification Search
CPC .... H02J 9/06; H02J 3/32; H02J 3/382; H02M 7/4807; H02M 2005/2932; H02M 5/297; Y02E 70/30; Y02B 10/72
See application file for complete search history.

(56) References Cited

U.S. PATENT DOCUMENTS

| | | | | |
|---|---|---|---|---|
| 7,599,196 B2 * | 10/2009 | Alexander | .......... | H02M 3/1582 363/124 |
| 2006/0103341 A1 * | 5/2006 | Steigerwald | ........ | H02M 3/1582 318/712 |

* cited by examiner

*Primary Examiner* — Jung Kim
(74) *Attorney, Agent, or Firm* — Robert O. Groover, III; Gwendolyn G. Corcoran; Groover & Associates PLLC

(57) ABSTRACT

Methods and systems for smart transfer switch circuits and operation, and for operation of transfer and/or cutoff switches in combination with a power-packet-switching-architecture (PPSA) power converter. The transistors of the transfer and cutoff switches, and the transistors of the phase legs of the PPSA power converter if present, preferably all use double-base bipolar transistors which have low on-state series resistance as the switching elements.

4 Claims, 29 Drawing Sheets

Motor Voltage Controller - Low Harmonic - 5 kHz, 480 VAC, 60 hp

SMART TRANSFER SWITCH DEVICES, SYSTEMS, AND METHODS USING DOUBLE-BASE BIPOLAR TRANSISTORS

CROSS-REFERENCE

Priority is claimed from U.S. applications 62/073,809 and 62/142,022, both of which are pending as of the effective filing date of the present application, and both of which are hereby incorporated by reference.

BACKGROUND

The present application relates to electrical power switching with smart transfer switches, and more particularly to implementation of soft-loading automatic transfer switches which employ closed-transition transfer switches.

Note that the points discussed below may reflect the hindsight gained from the disclosed inventions, and are not necessarily admitted to be prior art.

A transfer switch is an electrical switch that switches a load between two sources. Some transfer switches are manual, in that an operator effects the transfer by throwing a switch, while others are automatic, and switch when they sense one of the sources has lost or gained power.

An Automatic Transfer Switch ("ATS") is often installed where a backup power source is located, so that the backup can provide temporary electrical power if the utility source fails. The backup power source can be, for example, a fossil fuel generator, renewable energy power source (such as solar, water, or wind power), and/or batteries.

As well as transferring the load to the backup power source, an ATS may also command a local generator to start, based on the voltage monitored on the primary supply. The transfer switch isolates the local generator from the electric utility when the generator is on and providing temporary power. The control capability of a transfer switch may be manual only, or a combination of automatic and manual. The switch transition mode (see below) of a transfer switch may be Open Transition (OT) (the usual type), or Closed Transition (CT)).

For example, in a home equipped with a backup generator and an ATS, when an electric utility outage occurs, the ATS will tell the backup generator to start. Once the ATS sees that the generator is ready to provide electric power, the ATS breaks the home's connection to the electric utility and connects the generator to the home's main electrical panel. The generator supplies power to the home's electric load, but is not connected to the electric utility lines. It is necessary to isolate the generator from the distribution system—not only to protect the generator from overload in powering loads in the house, but also for safety, as utility workers expect the lines to be dead.

When utility power returns for a minimum time, the transfer switch will transfer the house back to utility power and command the generator to turn off.

A transfer switch can be set up to provide power to critical loads only, or to entire electrical panels (or subpanels). Some transfer switches allow for load shedding or prioritization of optional circuits, such as heating and cooling equipment. More complex emergency switchgear used in large backup generator installations permits soft loading, allowing load to be smoothly transferred from the utility to the synchronized generators, and back; such installations are useful for reducing peak load demand from a utility.

An open transition transfer switch is also called a break-before-make transfer switch. A break-before-make transfer switch breaks contact with one source of power before it makes contact with another. This configuration is simple, and prevents backfeeding from an emergency generator back into the utility line. Such switches are commonly used in conventional open transition automatic transfer switches; during the split second of the power transfer, the flow of electricity is interrupted. Another common example is a manual three position circuit breaker, with utility power on one side, the generator on the other, and "off" in the middle, which requires the user to switch through the full disconnect "off" position before making the next connection.

A typical emergency system uses open transition, so there is an inherent momentary interruption of power to the load when it is transferred from one available source to another (keeping in mind that the transfer may be occurring for reasons other than a total loss of power). In most cases this outage is inconsequential, particularly if it is less than ⅙ of a second.

A closed transition transfer switch ("CTTS") is also called a make-before-break transfer switch. There are some loads that are affected by even the slightest loss of power. There are also operational conditions where it may be desirable to transfer loads with zero interruption of power when conditions permit. For these applications, closed transition transfer switches can be provided. The switch will operate in a make-before-break mode provided both sources are acceptable and synchronized. Typical parameters determining synchronization are: voltage difference less than 5%, frequency difference less than 0.2 Hz, and maximum phase angle between the sources of 5 electrical degrees. This means that the fossil fuel engine driving the generator supplying one of the sources generally must be controlled by an isochronous governor. Batteries, and most renewables energy systems such as photovoltaic, use power inverters or converters that synchronize electronically to the grid sourcing current at the grid voltage and frequency. When disconnected from the grid, this power conversion equipment must generate the proper voltage and frequency, in a fashion similar to its operation when the grid is active.

It is generally required that the closed transition, or overlap time, be less than 100 milliseconds. If either source is not present or not acceptable (such as when normal power fails) the switch must operate in a break-before-make mode (standard open transition operation) to ensure no backfeeding occurs.

Closed transition transfer makes code-mandated monthly testing less objectionable because it eliminates the interruption to critical loads which occurs during traditional open transition transfer.

With closed transition transfer, the on-site fossil fuel engine generator set is momentarily connected in parallel with the utility source. This requires getting approval from the local utility company. Photovoltaic and battery power conversion equipment must adhere to safety standards for grid connected export of power such as UL 1741 and IEEE1574.

Typical load switching applications for which closed transition transfer is desirable include data processing and electronic loads, certain motor and transformer loads, load curtailment systems, or anywhere load interruptions of even the shortest duration are objectionable. A CTTS is not a substitute for a UPS (uninterruptible power supply); a UPS has a built-in stored energy that provides power for a prescribed period of time in the event of a power failure. A CTTS by itself simply assures there will be no momentary loss of power when the load is transferred from one live power source to another. As result CTTS are often installed with UPS systems that use fossil fuel generations, and will be increasingly used also with battery and renewable energy systems that can support loads when the utility grid is not available.

A soft-loading transfer switch ("SLTS") makes use of a CTTS, and is commonly used to synchronize and operate onsite generation in parallel with utility power, and to transfer loads between the two sources while minimizing voltage or frequency transients.

A static transfer switch uses power semiconductors such as Silicon-controlled rectifiers (SCRs) to transfer a load between two sources. Because there are no mechanical moving parts, the transfer can be completed rapidly, perhaps within a quarter-cycle of the power frequency. Static transfer switches can be used where a reliable and independent second source of power is available and it is necessary to protect the load from even a few power frequency cycles interruption time, or from any surges or sags in the prime power source.

Conventionally, an Automatic Transfer Switch (ATS) uses electromechanical relays to transfer power. Power transfer can typically be completed within approximately 8-16 msec, or a half power cycle at a typical US power frequency of 60 Hz. As of 2012, a single phase rack mounted automatic transfer switch cost approximately $100-$150/kVA.

A Static Transfer Switch ("STS"), on the other hand, conventionally uses semiconductor switches (typically thyristors or silicon controlled rectifiers) to transfer power. Power transfer can typically be completed within about 4 msec, or approximately a quarter power cycle at a power frequency of 60 Hz. In 2012, the cost for a single phase rack mount STS was approximately $550-$700/kVA. Static transfer switches are inherently better suited to sensitive equipment than automatic transfer switches, as typically such sensitive applications require power transitions to be completed in a quarter cycle or better. Conventional static transfer switches, however, suffer from relatively high efficiency losses of 0.5-1%, and also tend to have significantly higher failure rates than automatic transfer switches. FIG. 2A shows an example of a conventional STS system.

Increased demand for consistent and reliable power, aging of electrical grids, frequent power failures, regulations in the industry and the growth of data centers and generator businesses are the major factors that have had a favorable impact on the global transfer switch market. All these factors have resulted in the transfer switch market growing extensively throughout the world. The revenue of the global transfer switch market was $624 m in 2005. The market has traditionally witnessed a growth of 4-5% per year, with the revenues increasing every year. The boom in the data centers and the IT industry has also helped in pushing the market even further. The backup generator industry has already proven to be a high value market, and this has driven the transfer switch market to even higher levels. After a minor setback with the financial crisis in late 2008, the market once again grew rapidly, and consequently, decent growth was witnessed in the transfer switch business. By 2010, the revenue of the global transfer switch market was around $800 m. The market is also expected to show significant growth in the future. It is expected that the market will reach a value of $1,521 M in 2020.

A primary application for transfer switches today is for use in data centers, but other critical load requirements are also becoming more and more prevalent. As grid connected battery systems are more widely deployed in there will be increasing demand to include transfer switches to allow these battery assets to also be used for backup power if even for a short period of time. At present, a 150 A 480V STS (115 kW) costs about $10,000, or $87/kW.

These systems weigh about 1000 lbs. Peak efficiency for these systems is approximately 99%, and more likely closer to 98% for most products.

US application US 2014-0375287 (which is hereby incorporated by reference) describes a new kind of semiconductor device, referred to herein as a "B-TRAN." A B-TRAN is a symmetric bidirectional bipolar junction transistor, which has two separate base contact regions near the two separate emitter/collector regions. Preferably the bulk of a semiconductor die provides the base, in either direction of current flow; but since the two different base contact regions are operated separately (and differently), this type of device is referred to herein as a "double-base" transistor. B-TRANs provide a very low forward voltage drop, and hence operate very efficiently as switching devices.

The present application teaches, among other innovations, smart transfer switch circuits, using double-base bipolar transistors which have low on-state series resistance as the switching elements. In one preferred class of embodiments, these transistors are implemented as B-TRANs. Various embodiments described below permit the transfer switch to operate efficiently without requiring break-before-make operation.

In one class of embodiments, the transfer switch has its own local control circuitry, which provides a feedback output to shift the phase of one of the lines.

In one class of embodiments, the transfer switch is integrated in a single module with a PPSA (Power Packet-Switching Architecture) power converter, and both use double-base bipolar transistors.

Several specific inventive configurations are also disclosed, which provide important synergies in addition to those of the combinations just mentioned.

The present application also teaches, among other innovations, methods for automatic transfer switch operation using low-loss bidirectional switches.

The present application also teaches, among other innovations, systems which make use of the circuits, modules, and methods described herein.

BRIEF DESCRIPTION OF THE DRAWINGS

The disclosed inventions will be described with reference to the accompanying drawings, which show important sample embodiments and which are incorporated in the specification hereof by reference, wherein:

FIGS. 1A and 1B show only one-wire connections, but in practice the connections would typically include n-wire connections.

DETAILED DESCRIPTION OF SAMPLE EMBODIMENTS

The numerous innovative teachings of the present application will be described with particular reference to presently preferred embodiments (by way of example, and not of limitation). The present application describes several inventions, and none of the statements below should be taken as limiting the claims generally.

The present application discloses new approaches to smart transfer switches and to standby power subsystems. One sample embodiment of a smart transfer switch system incorporating B-TRANs can be seen in FIG. 1A. Here two B-TRAN switches SW1 and SW2 permit an unswitched terminal T1 to be connected to either of two switched terminals T2 and T3. T1 can be, for example, connected to a critical load, while T2 can be, for example, a grid connection. T3 can be, for example, a connection to a local power supply. The local power supply can be, for example, a battery bank followed by an inverter, or a clean energy source (such as solar power) followed by an inverter, or a filtered output from an internal combustion or gas turbine generator. The control circuitry CC receives voltage sensing inputs from all three lines, and operates the switches SW1 and SW2 automatically (unless overridden). By sampling the voltage at a rate much greater than the line frequency, the control circuitry CC can detect any mismatch in voltage magnitude, frequency, or phase. In this example the control circuitry is shown as providing error outputs for all three of these parameters, but of course other implementations can be used; for example, if a diesel generator's phase is being adjusted, a simple speed-up or slow-down signal may be sufficient. Other voltage sensing connections can also be used; for example, the voltage sensing may be performed by two differential sensors, rather than by ground-referenced sensors.

Figure 1A:
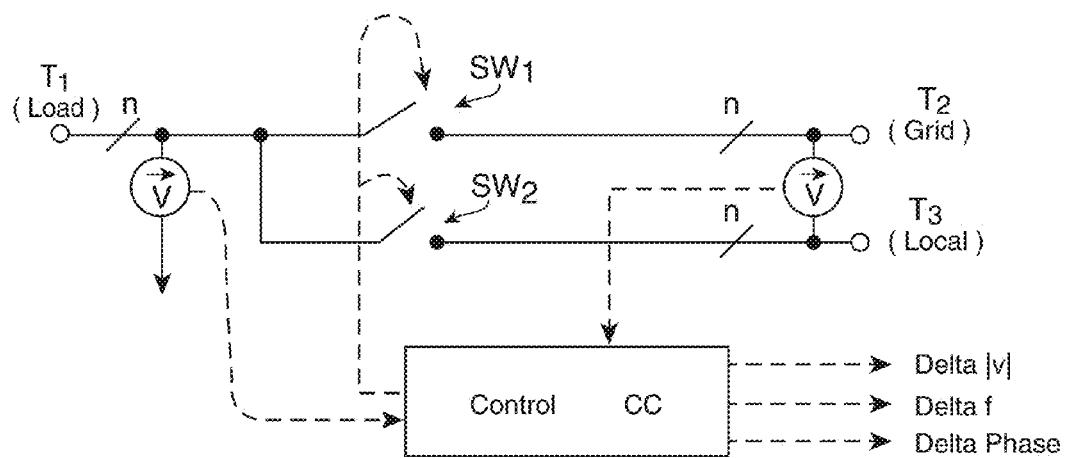
FIG. 1A shows one sample embodiment of a smart transfer switch system incorporating B-TRANs.
Figure 1B:
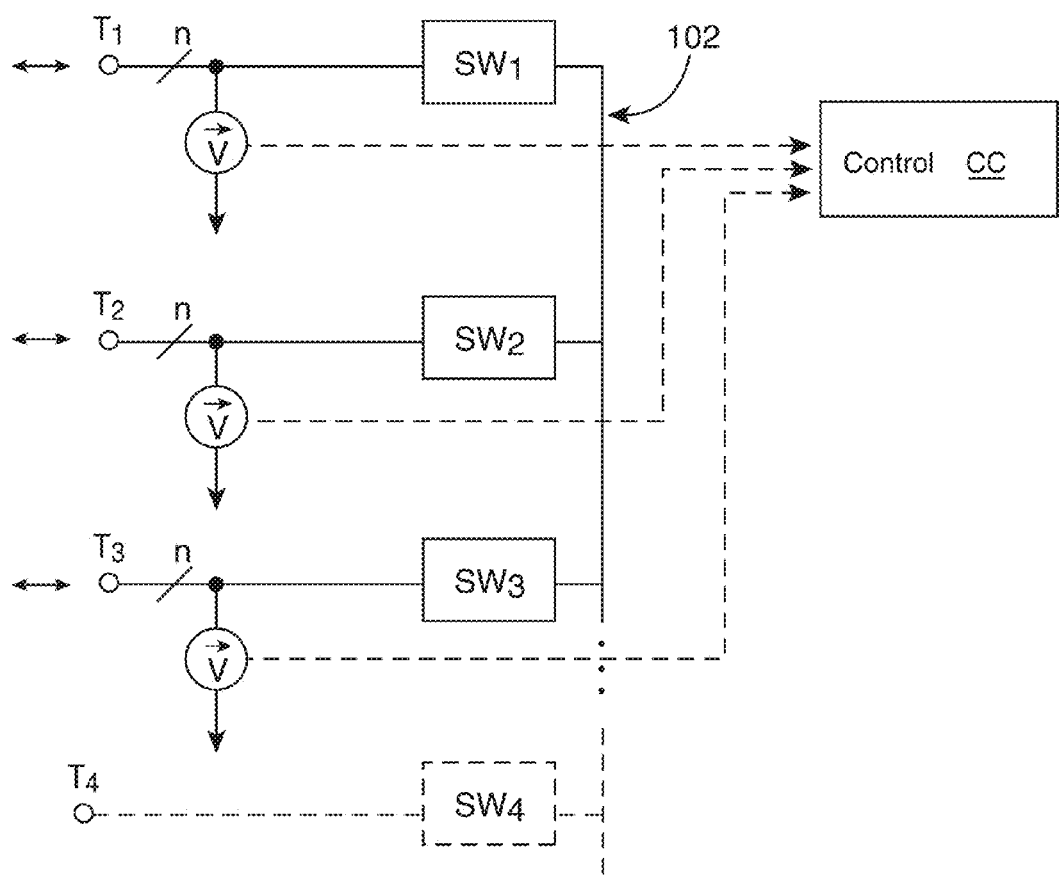
FIG. 1B shows a more generalized structure.

FIG. 1B shows a more generalized structure. Here there are three bidirectional switches SW1, SW2, and SW3, which respectively connect one of terminals T1, T2, and T3 to a local power bus 100. Note that all three switches are fully bidirectional, so any one of them can be an input terminal, an output terminal, or both. All of the terminals T1-T3 can handle different directions of current at different times, and each switch can both source and sink current (at various times) to the power bus 100.

Figure 1C:
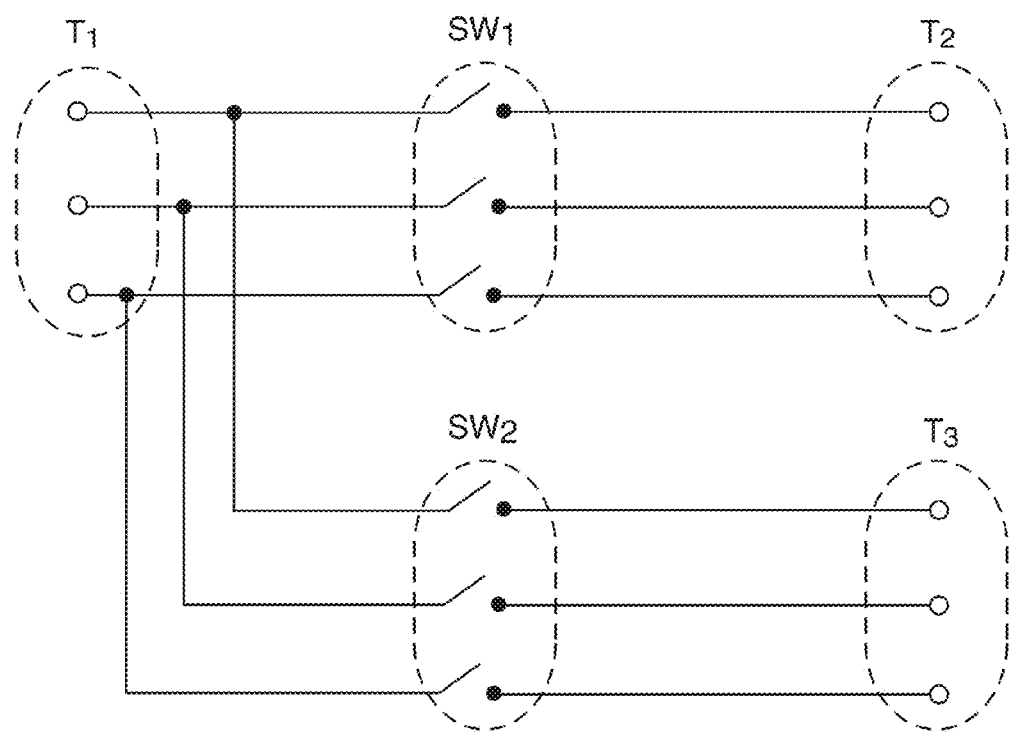
FIG. 1C illustrates how, for three-phase delta connections, each of the switches SW1 or SW2 includes three physically separate switch components, all operated by the same control signal.

FIGS. 1A and 1B show only one-wire connections, but in practice the connections would typically include n-wire connections. FIG. 1C illustrates how, for three-phase delta connections, each of the switches SW1 or SW2 includes three physically separate switch components, all operated by the same control signal.

The topology of FIG. 1B can easily be extended to four or more n-wire terminals, as is generally indicated by the lines shown in phantom.

Figure 2:
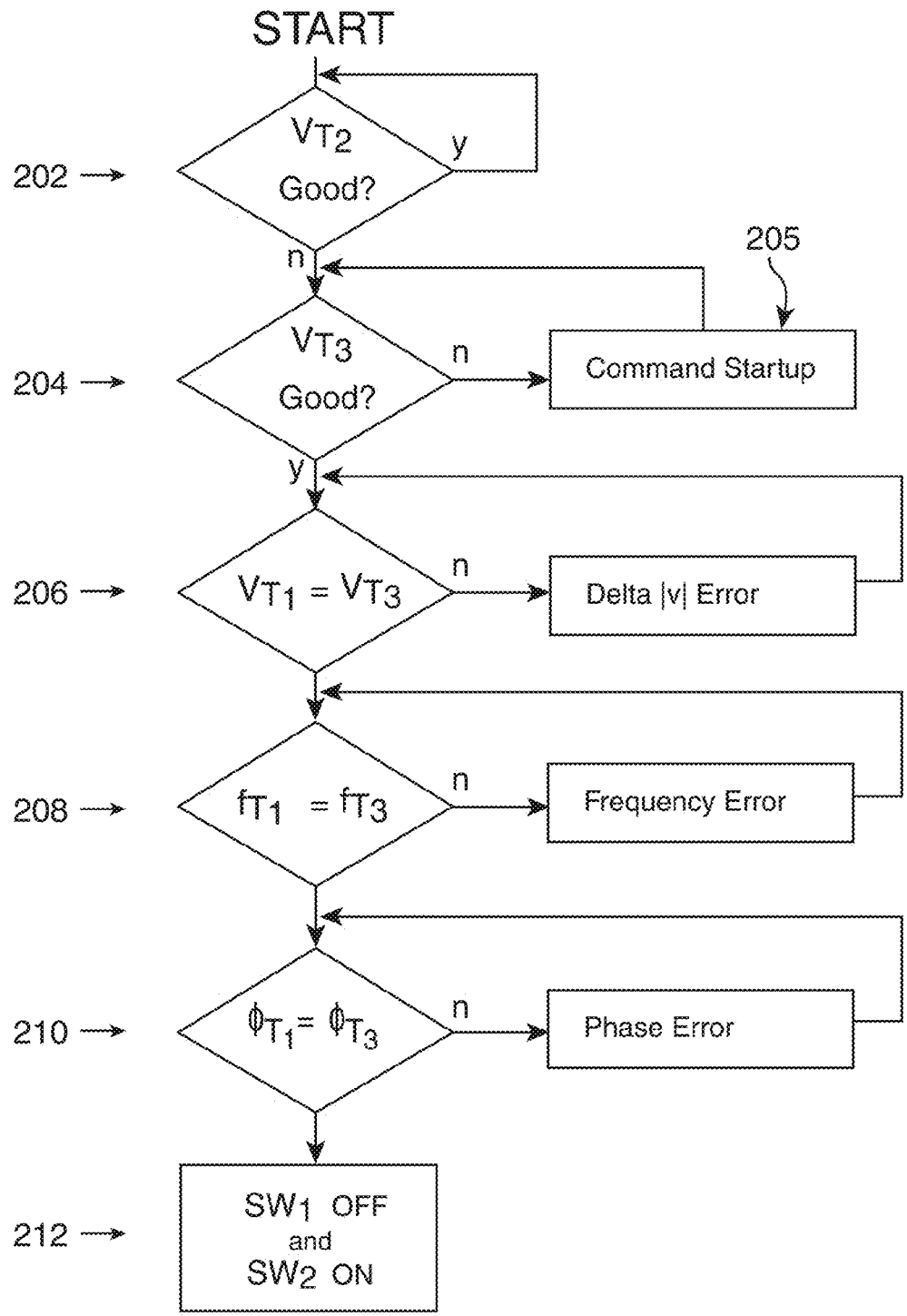
FIG. 2 shows a simple example of operating the apparatus of FIG. 1A.

FIG. 2 shows a simple example of operating the apparatus of FIG. 1A. At step 202, a dropout in grid voltage $V_{T2}$ (on any of the lines of terminal T2) is detected. At that point the voltage VT3 on terminal T3 is checked (step 204), and (optionally) a startup command is sent to the local power source if needed (step 205).

The magnitude of voltage difference between terminals T1 and T3 is now checked (step 206), as are the frequency (step 208) and phase (step 210). Feedback signals can be output accordingly, to indicate voltage, frequency, and/or phase errors. Assuming that these errors are within limits, the state of switches SW1 and SW2 is flipped, so that load terminal T1 is now powered from local power supply terminal T3.

The example of FIG. 2 is somewhat oversimplified, because it is most preferable to monitor frequency and phase difference continuously (whether or not the local power supply is being used), and to provide feedback so these differences are always withing acceptable limits.

When grid voltage VT2 again becomes valid, a similar process is followed, leading to closure of switch SW1 and opening switch SW2. Here any frequency or phase correction must be performed on the load side, since the grid phase cannot be changed.

A particular advantage of B-TRANs in this architecture is their combination of low forward voltage and fast turnoff. The fast turnoff helps to assure that no backfeed will occur when CTTS switching is used to reconnect to grid power.

Thus smart transfer switch systems incorporating B-TRANs can be significantly cheaper, lighter, and smaller than conventional STS systems. A 200 A, 480 VAC, 3-phase, B-TRAN-based STS system weighs approximately 40 lbs. (compared to approximately 900 lbs. for a conventional 200 A system), most of which is accounted for by one or more heat sinks if the system is passively cooled, and a small (~40 VA) transformer for driving the B-TRANs. Such a system is expected to cost roughly $800 to manufacture commercially, which is a significant improvement over conventional offerings (which often cost on the order of $10,000 for a 150 A, 480 VAC, 3-phase STS system). One such exemplary system can comprise three B-TRANs, a heat sink and transformer, controls, and other necessary components, with no enclosure.

Figure 3A:
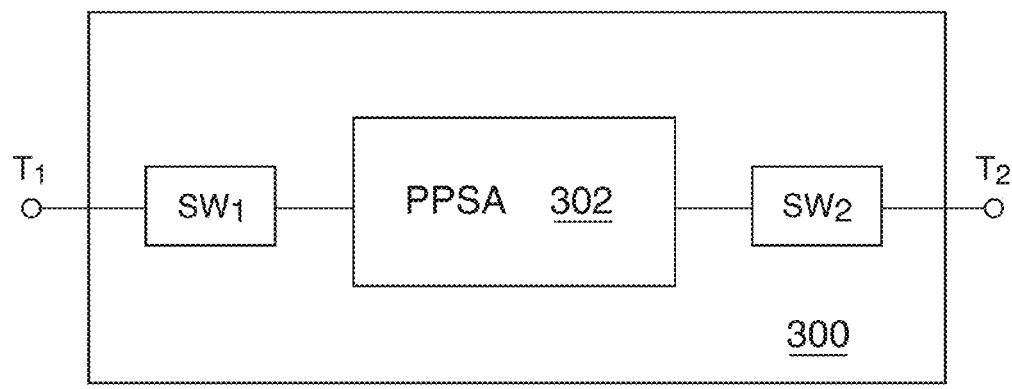
FIG. 3A shows an expanded subsystem which include both a two-port PPSA power converter and B-TRAN cutoff switches.

FIG. 3A shows an expanded subsystem 300, including both a two-port PPSA power converter 302 and B-TRAN cutoff switches SW1 and SW2. Preferably the PPSA itself also includes B-TRAN switches in its phase legs, as detailed in the following figure. The subsystem 300 is most preferably integrated in a single module, with unified heat sinking.

One special advantage of FIG. 3A (and also of the configurations of FIGS. 4 and 5 etc.) is that the added cutoff switch at the grid connection can be used (when needed) to provide absolute assurance that backfeeding of power into the grid will never occur. Some utilities are very concerned about backfeeding, and the presence of an additional switch can be used to add another layer of protection against this possibility.

Figure 3B:
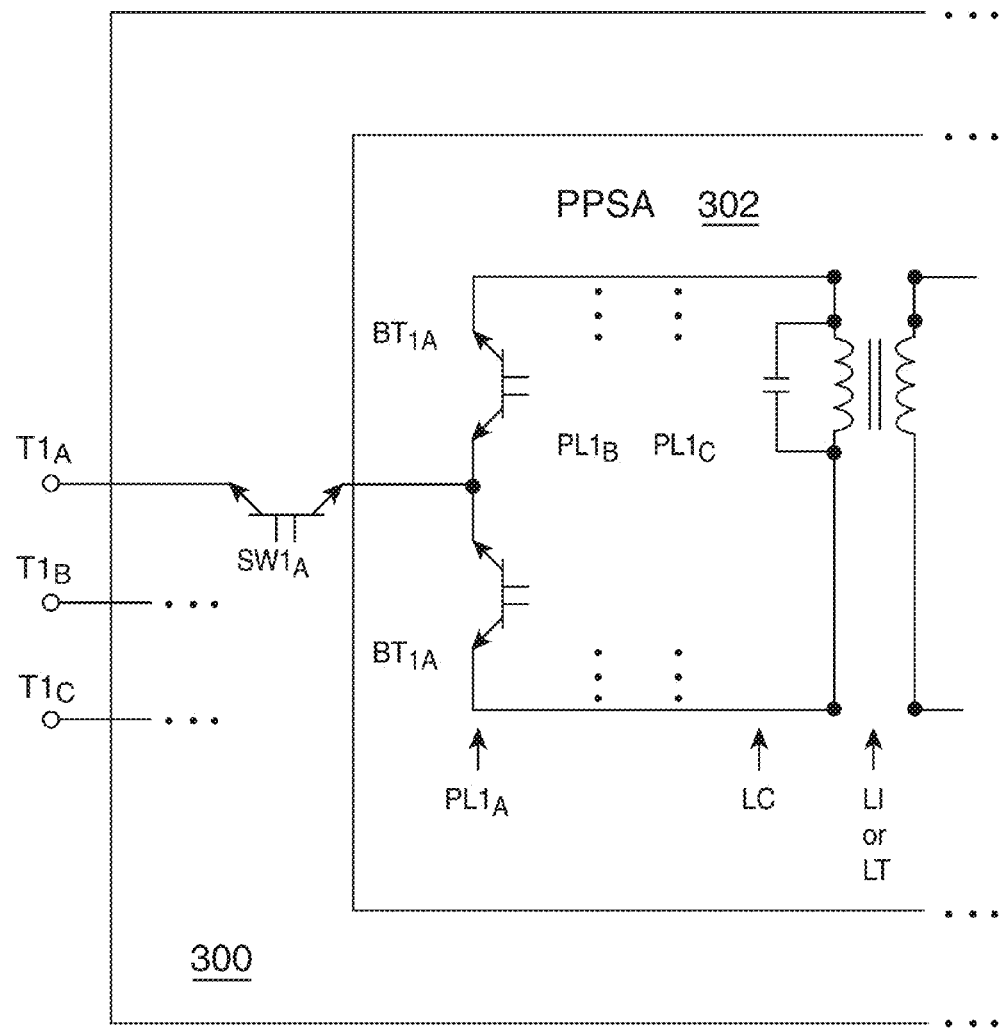
FIG. 3B shows a detailed view of connections and correspondences, within a subsystem like that of FIG. 3A.

FIG. 3B shows a detailed view of how, within the (preferably integrated) subsystem 300, one line of terminal T1 is connected into one phase leg of the PPSA 302 of FIG. 3A. Only one line of the switch SW1 is shown, for clarity.

An important aspect of the PPSA architecture is that each terminal of each port can be an AC connection, and the switches in each phase leg are bidirectional switches. That is, the two internal lines which are connected to the link capacitor LC both operate over the full range of AC line voltages, and there is no average polarity difference. In this architecture, a cutoff switch which can isolate a PPSA must be fully bidirectional. The B-TRAN's unique combination of fully bidirectional operation and low loss provides an important synergy with the PPSA.

Returning to FIG. 3B: the B-TRAN labeled as $SW1_A$ is one of the elements of switch SW1, and can be identical to both of the B-TRANs $BT_{1A}$ in the phase leg $PL1_A$. (In this example, the other two phase legs PL, and their connection through other B-TRANs to the external lines $T1_B$ and $T1_C$, are shown only schematically.) The B-TRAN $SW_{1A}$ in the cutoff switch SW1 can advantageously have the same voltage and current rating as the phase leg's B-TRANs $BT_{1A}$. (This is not electrically necessary for operation, but helps facilitate assembly and avoid errors, and also simplifies supply chain management.)

A PPSA can be implemented with a link transformer LT rather than a simple link inductor LI. In this example, the link inductor is shown as half of a link transformer. This is important because the cutoff switch B-TRAN devices at each terminal are preferably matched to the phase leg B-TRAN devices at that terminal. For example, if one side of the two port PPSA 302 is connected to 240V three-phase AC at terminal T1, and the other side is connected to 480V three-phase at terminal T2, a 2:1 transformer can be used. In this case terminal T1 will see only half the voltage as terminal T2, and different devices can be used. For example, in this specific case, 600V-rated B-TRANs might be used in the cutoff switch SW1 at terminal T1, and in the phase legs PL1 connected to that terminal; whereas 1200V-rated B-TRANs might used for the cutoff switch, AND in the phase legs, connected to the wires of terminal T2.

A further advantage of the combined subsystem of FIG. 3A (and of the combined subsystems in the following figures) is that the cutoff switches provide additional safety in operation. Accidental passage of a hot voltage across the PPSA cannot occur without failure of multiple switches in the PPSA AND failure of cutoff switches into the ON state.

Note that the redundancy is reciprocal: the switches in the PPSA also provide redundancy which allows the switches SW1 and SW2 to be operated in CTTS mode (make-before-break). Utilities may be extremely cautious about avoiding any backfeeding into the grid, and the combination of PPSA with a B-TRAN cutoff switch prevents this problem from ever occurring (at least in locations where it is forbidden).

Figure 4:
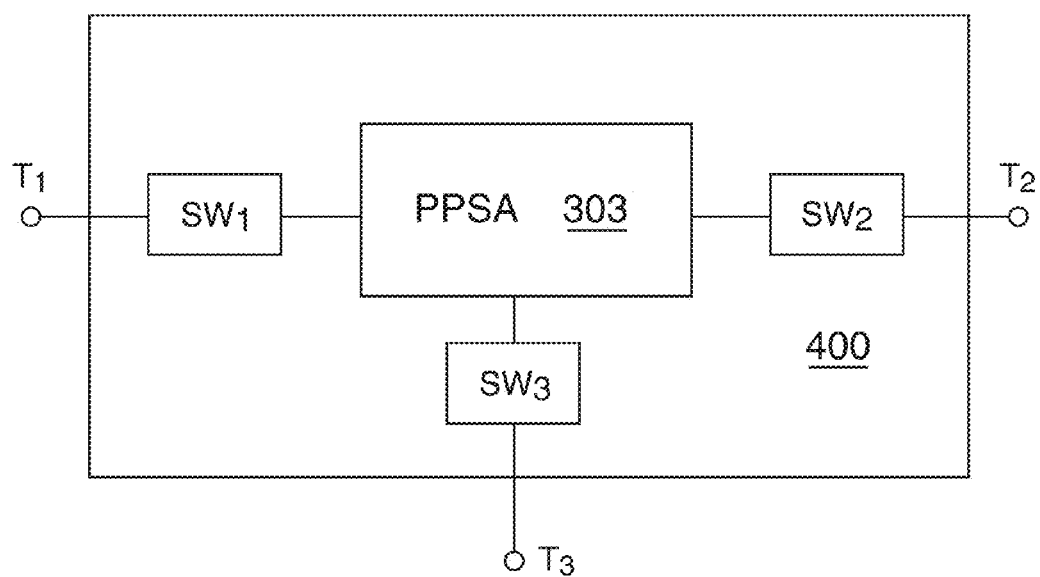
FIG. 4 shows another combined subsystem, using a three-port PPSA converter with three external B-TRAN switches.

FIG. 4 shows another combined subsystem. In this example, a three-port PPSA 303 is combined with three external B-TRAN switches SW1, SW2, and SW3 to form a combined subsystem 400. Here again, combined subsystem is most preferably integrated into a single module. Also, the B-TRAN components of the cutoff switches at each port are advantageously matched to the B-TRAN components of the PPSA's phase leg connected to that port. Here too, the addition of cutoff switches provides additional safety; since the forward voltage of the B-TRAN devices is so low, this safety is achieved without any increase in power dissipation.

Figure 5:
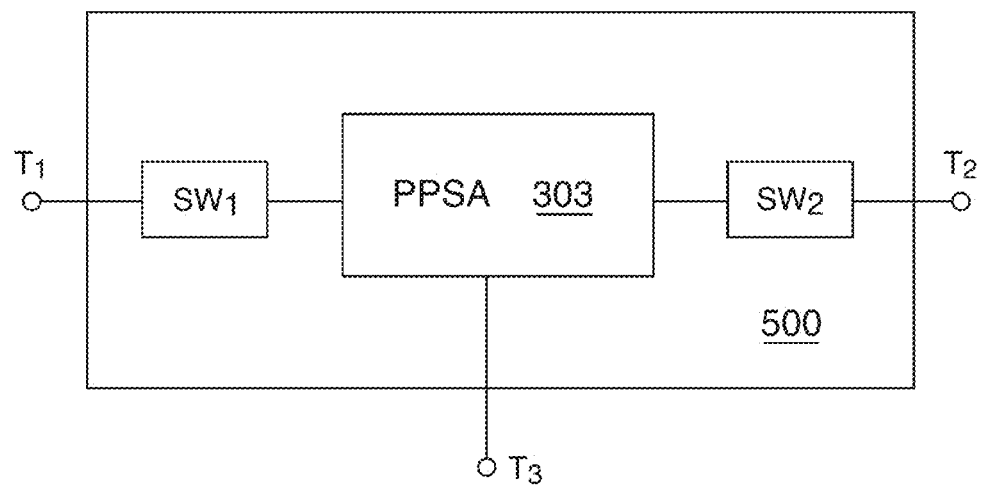
FIG. 5 shows another combined subsystem, using a three-port PPSA converter with only two external B-TRAN switches.

FIG. 5 shows another combined subsystem 500. In this example, a three-port PPSA 303 is combined with only two external B-TRAN switches SW1 and SW2 to form the combined subsystem 500. Here again, combined subsystem 500 is most preferably integrated into a single module. Also, the B-TRAN components of the cutoff switches at each port are advantageously matched to the B-TRAN components of the PPSA's phase leg connected to that port. Here too, the addition of cutoff switches provides additional safety; since the forward voltage of the B-TRAN devices is so low, this safety is achieved without any increase in power dissipation.

In combined subsystems like those of FIG. 3A, 4, or 5, a complete transfer switch (e.g. like that of FIG. 1A) can optionally be substituted for the cutoff switches shown. This provides further synergies, corresponding to both those of FIG. 3A (or 4 or 5) and 1A (or the like).

Figure 6:
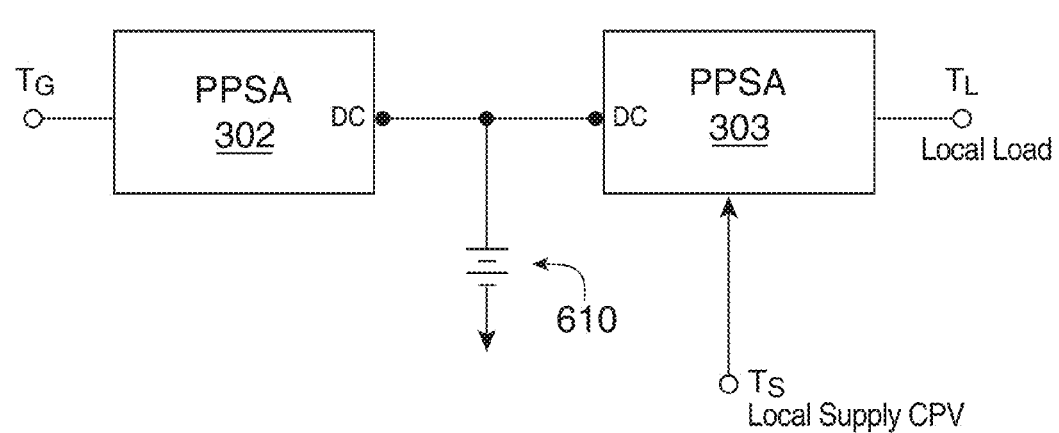
FIG. 6 shows another combined subsystem, where two PPSA converters are both connected to a shared battery, and jointly provide connection to weak grid, a local load, and a local power supply.

FIG. 6 shows another combined subsystem. In this example, a two-port PPSA 302 and three-port PPSA 303 are both connected to a shared battery 610. Terminal $T_G$ is connected to grid, and terminal $T_L$ is connected to a local load. Terminal $T_S$ is connected to a local power supply, which can be e.g. a photovoltaic array. This configuration is particularly advantageous where the grid connection is a "weak" grid, i.e. relatively unreliable. The two converters are operated jointly to power the load terminal from the grid terminal, or the local power supply, or the battery.

Optionally an additional bidirectional cutoff switch can be interposed between the battery 610 and the node which is shared between the power converters. The battery 610 is of course DC, but by providing this cutoff switch power transfer between the AC ports TG and TL can be performed with AC waveforms on the intermediate node if desired.

Figure 7:
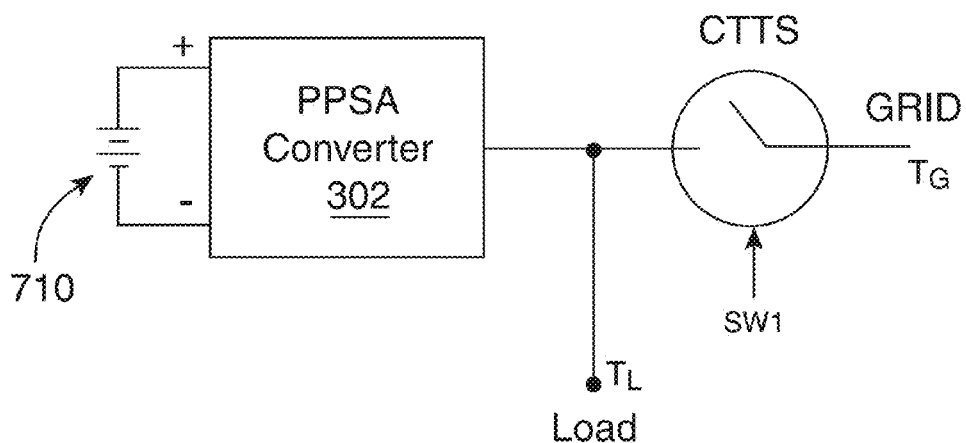
FIG. 7 shows another system configuration, where a B-TRAN switch provides cutoff between a PPSA converter and a grid terminal.

FIG. 7 shows another system configuration. Here a B-TRAN set SW1 is used to provide cutoff between a two-port PPSA 302 and a grid terminal TG. A battery 710 is connected to the other port of the PPSA, and the load elements are connected to a terminal TL, which is on the same side of switch SW1 as the PPSA is.

Figure 8:
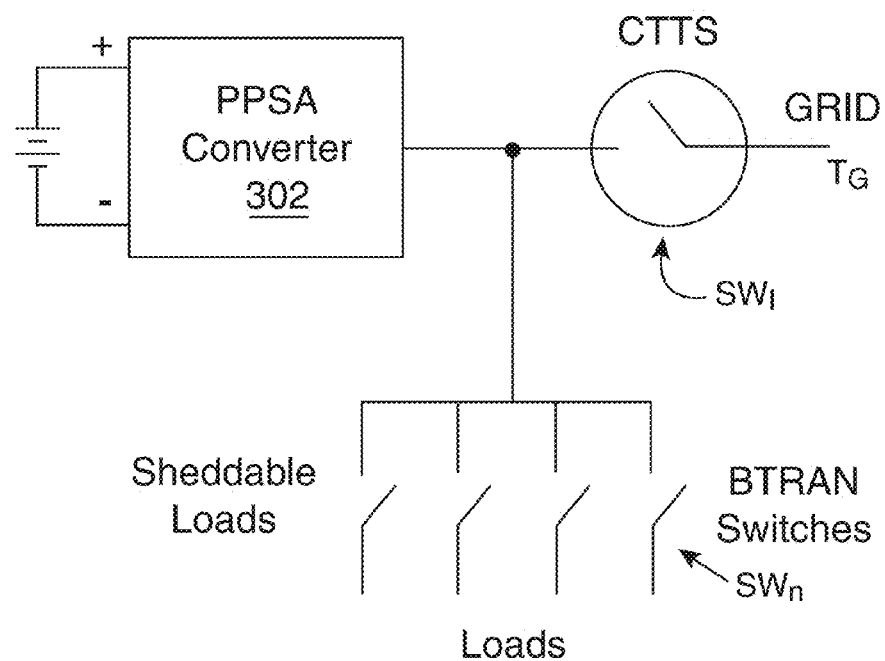
FIG. 8 shows another system configuration, where multiple B-TRAN switch sets permit the progressive disconnection of sheddable loads.

FIG. 8 shows another system configuration. This is generally similar to that of FIG. 7, except that multiple B-TRAN switch sets SWn are used to permit the progressive disconnection of sheddable loads.

Figure 9:
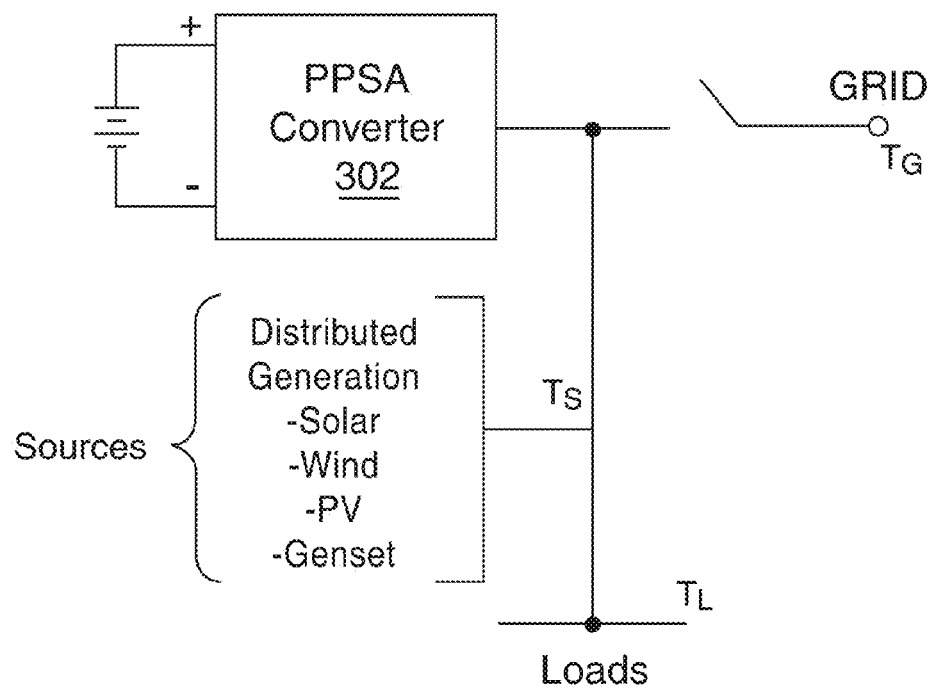
FIG. 9 shows another system configuration, where multiple B-TRAN switch sets permit elective connection or disconnection of local power sources.

FIG. 9 shows another system configuration. This is generally similar to that of FIG. 8, except that multiple B-TRAN switch sets SWn are used to permit the selective connection or disconnection of local power sources at terminal TS.

Figure 10:
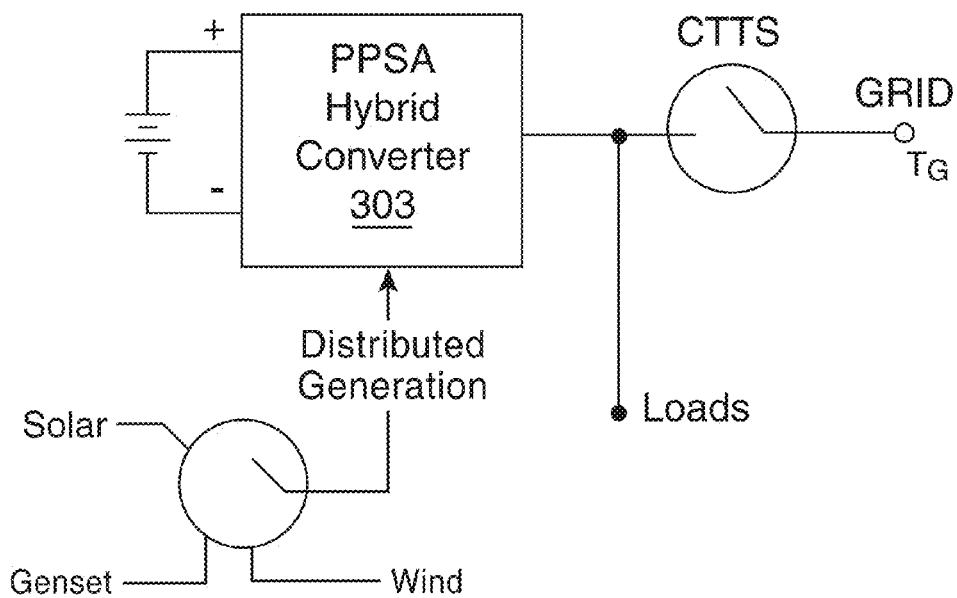
FIG. 10 shows another system configuration, where multiple B-TRAN switch sets permit the selective connection or disconnection of local cogeneration.

FIG. 10 shows another system configuration. This is generally similar to that of FIG. 9, except that multiple B-TRAN switch sets SWn are used to permit the selective connection or disconnection of local cogeneration subcircuits at terminal TS.

Following is some additional detail on implementation and operation of the foregoing circuits, and of alternative circuit implementations.

Figure 11:
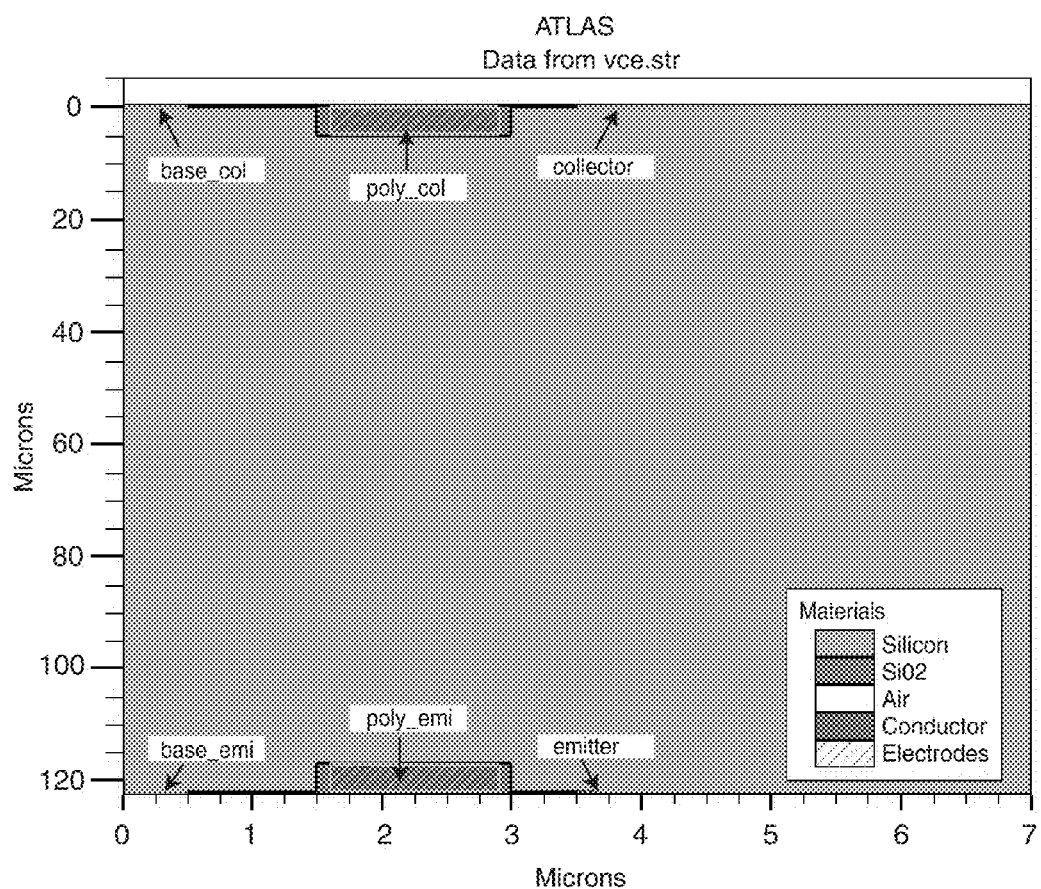
FIG. 11 shows a model npn B-TRAN which has been simulated.

Simulations of a model npn B-TRAN as seen in FIG. 11 were performed in ATLAS by Silvaco. The simulated B-TRAN has a nominal base doping of $10^{14}$ cm$^{-3}$, a base width of 120 µm, a trench depth of 5 µm, and a trench width of 1.5 µm.

Figure 12:
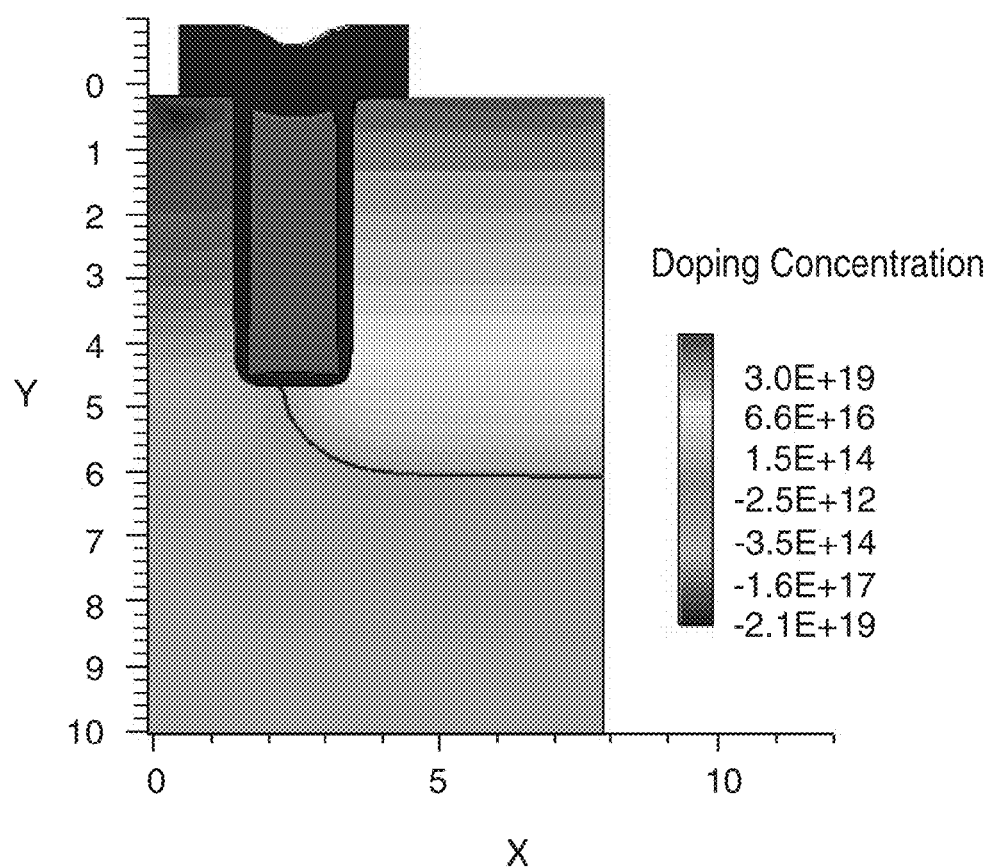
FIG. 12 shows a close-up view of one emitter/collector region (which acts as an emitter or a collector depending on the conduction direction).

FIG. 12 shows a close-up view of one emitter region (which acts as an emitter or a collector depending on the conduction direction). Doping densities in the emitter region vary from approximately $10^{14}$-$10^{15}$/cm$^3$ near the emitter-base junction to greater than $3\times10^{19}$/cm$^3$ at the surface of the device. The emitter-base junction has a depth of 6 µm. Doping densities in the base region vary from approximately $10^{12}$-$10^{14}$/cm$^3$ in the bulk region to approximately $2\times10^{19}$/cm$^3$ at the surface.

Figure 13:
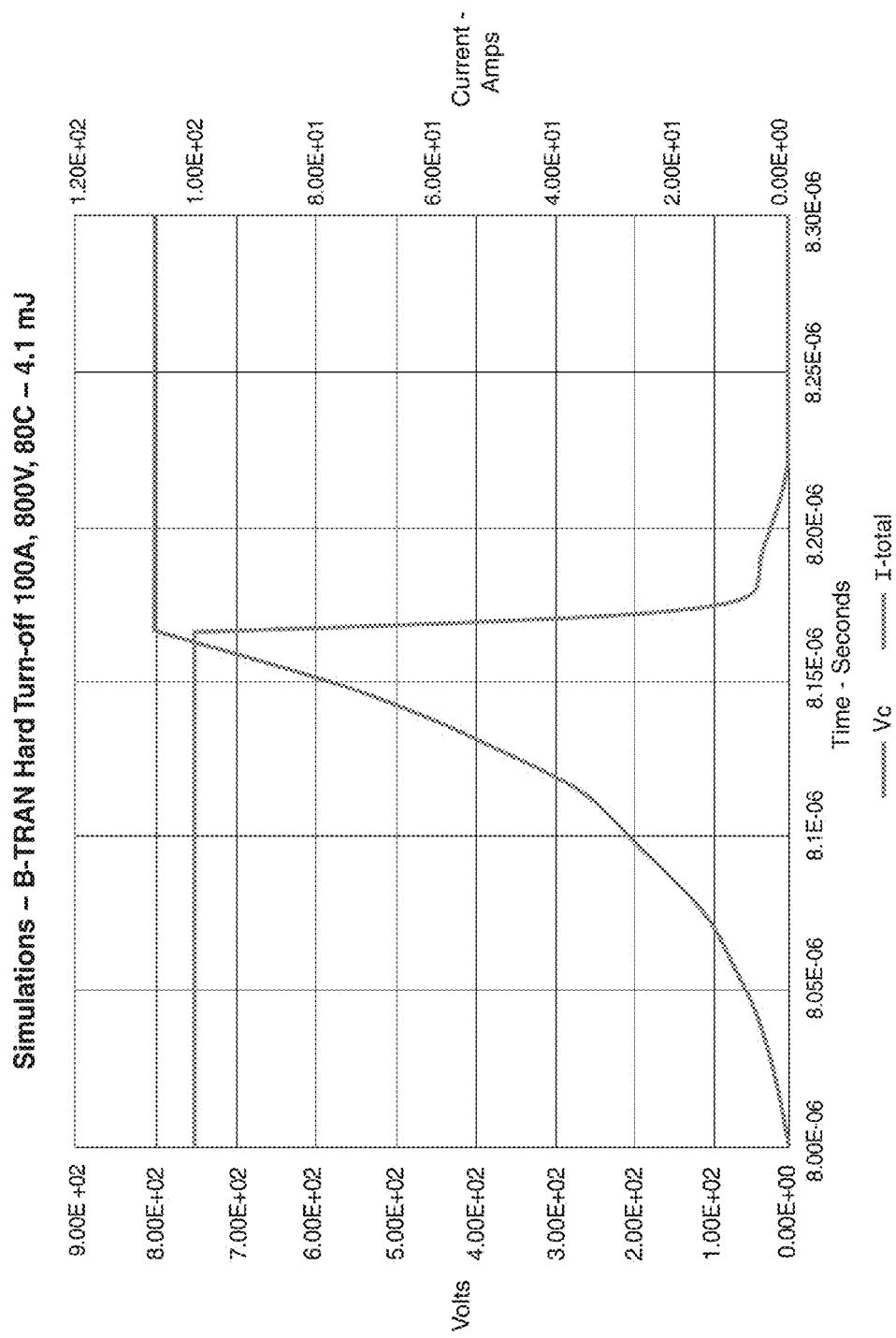
FIG. 13 shows a simulated B-TRAN hard turn-off at 100 A, 800 V, and 80° C.

FIG. 13 shows a simulated B-TRAN hard turn-off at 100 A, 800 V, and 80° C. During the interval shown, the voltage on the collector rises roughly exponentially from near zero to 800 V over the course of ~160 ns, then remains steady at 800 V. When the collector voltage $V_C$ reaches 800 V, the total current drops rapidly from 100 A to ~1 A over the course of ~10 ns, then decreases more gradually to zero over the next 10-15 ns. Energy dissipated in this transition, due to instants when nonzero current flows at nonzero voltage, is 4.1 mJ.

Figure 14:
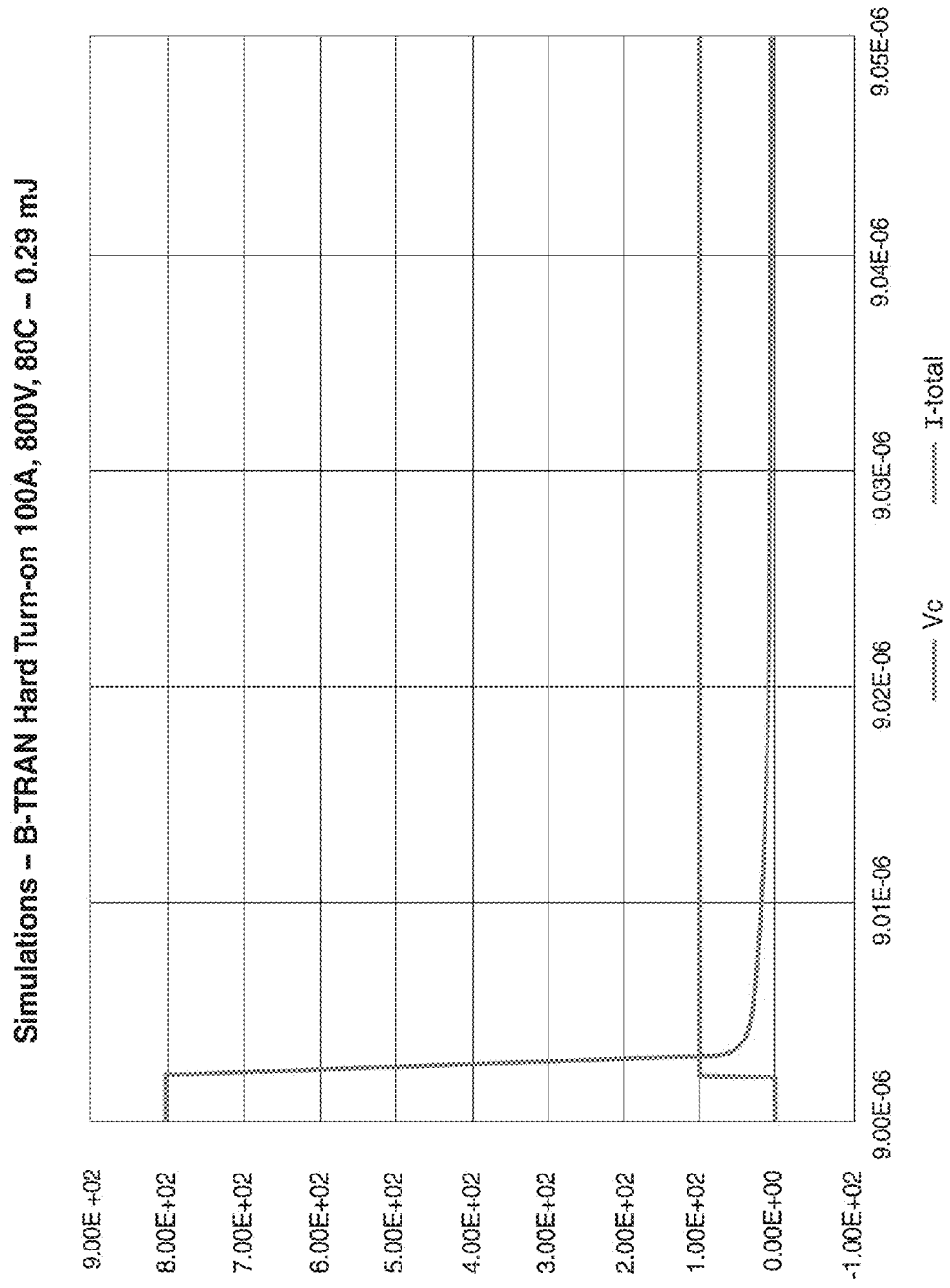
FIG. 14 shows simulated collector voltage $V_C$ and total current $I_{total}$ for a hard B-TRAN turn-on for 100 A, 800 V, and 80° C.

FIG. 14 shows simulated collector voltage $V_C$ and total current $I_{total}$ for a hard B-TRAN turn-on for 100 A, 800 V, and 80° C. Within a few nanoseconds of the total current increasing rapidly from zero to 100 A, the collector voltage $V_C$ drops rapidly from 800 V, and then near-asymptotically approaches zero over the subsequent 40-50 ns. Energy dissipated in this transition, due to instants when nonzero current flows at nonzero voltage, is 0.29 mJ.

Figure 15:
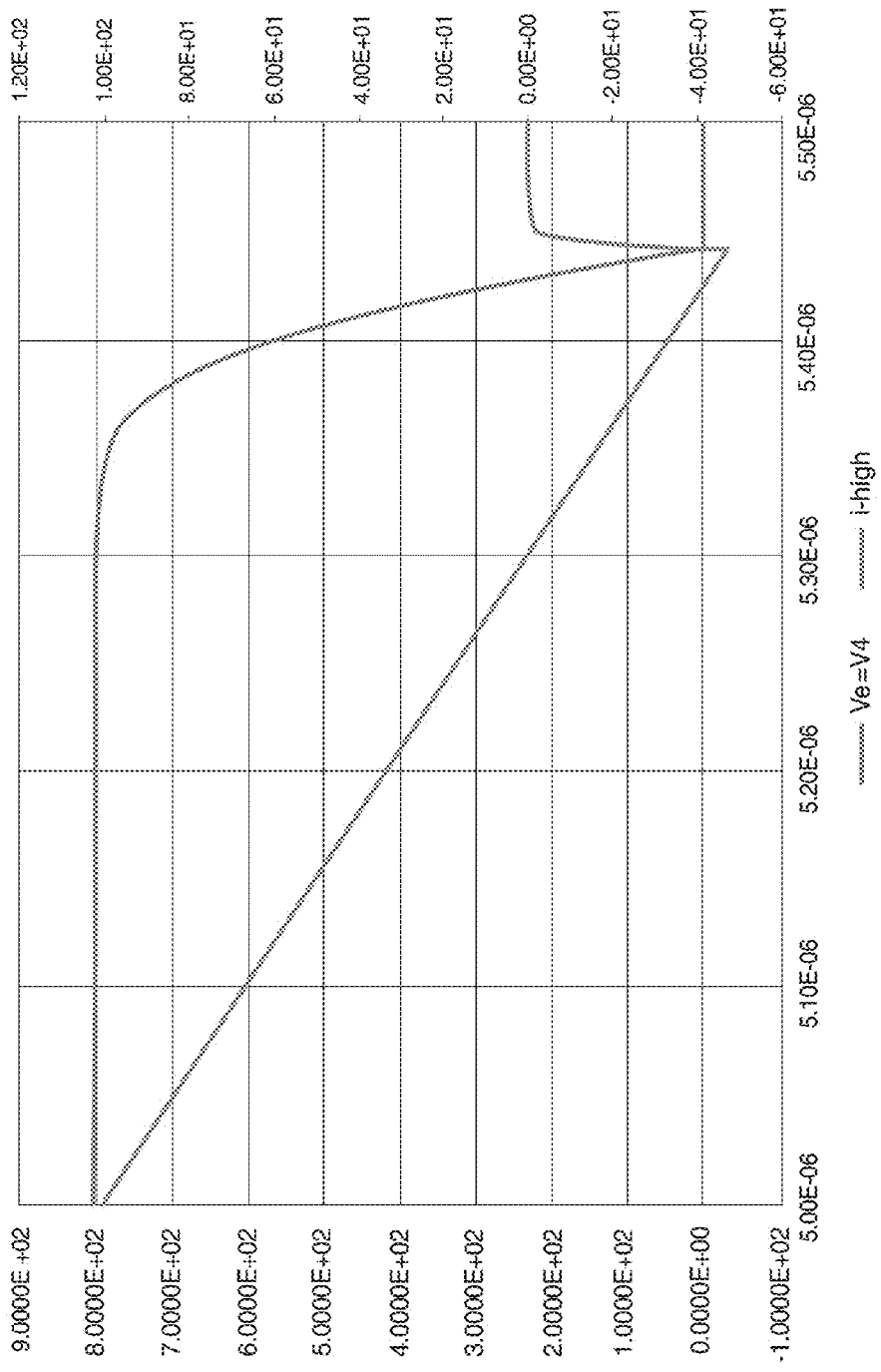
In FIG. 15, a hard B-TRAN turn-on with reverse recovery is simulated under the same operating conditions as in FIGS. 13-34.

In FIG. 15, a hard B-TRAN turn-on with reverse recovery is simulated under the same operating conditions as in FIGS. 13-14. This Figure relates particularly to the pull-up device in the operating configuration of FIGS. 21-28, and will be discussed further below.

In the interval shown, current $I_{high}$ decreases linearly from 100 A to ~−4.5 A over ~45 ns, then near-asymptotically approaches zero over ~5 ns. Emitter voltage $V_e$ decreases exponentially from 800 A, beginning to drop most noticeably at around the time current $I_{high}$ crosses zero, reaching and maintaining ~0 V when current $I_{high}$ reaches its minimum and begins increasing back to 0 A. Energy dissipated in the high-side device during this transition is 1.1 mJ. (However, another 22.6 mJ is dissipated in the other BTRAN device, during the operations described below.)

Figure 16:
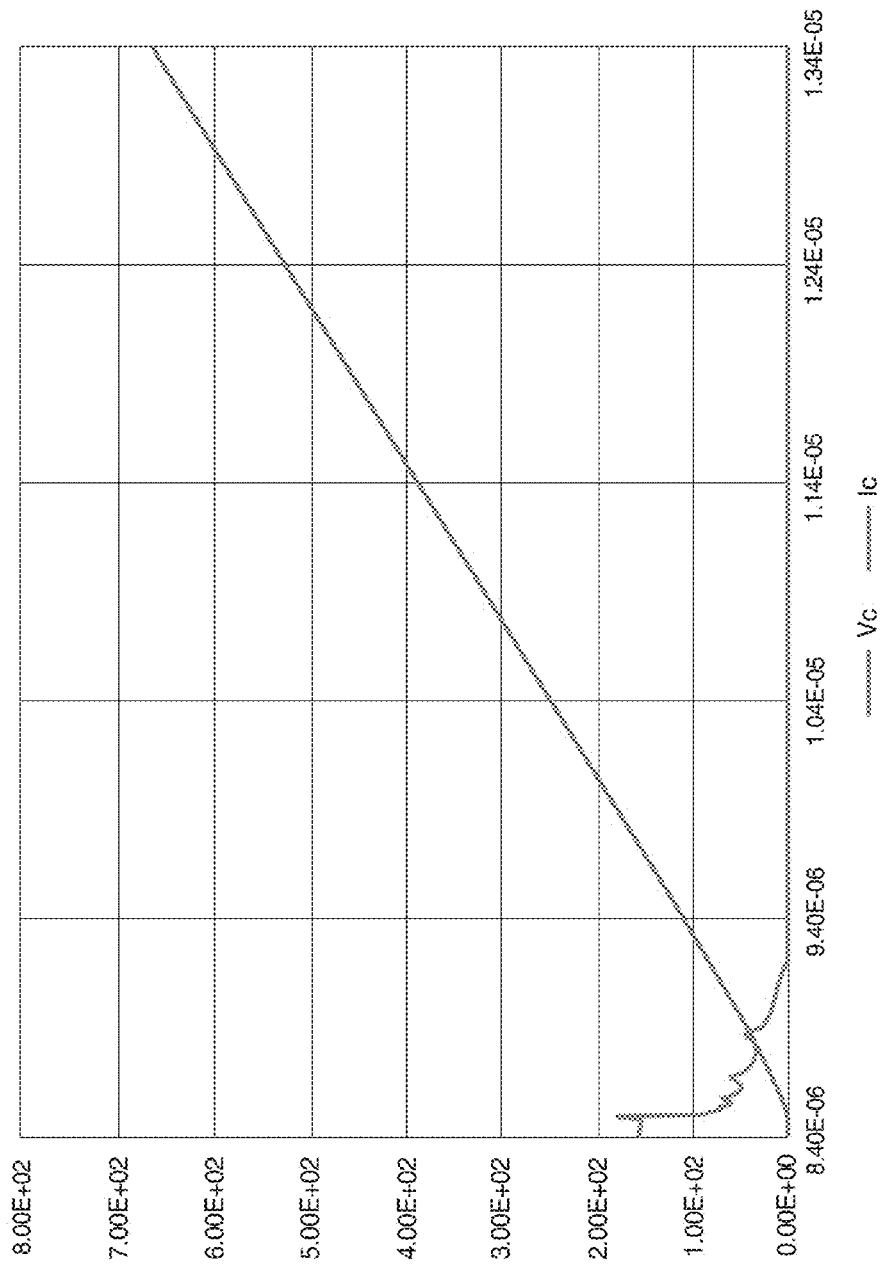
FIG. 16 simulates turnoff of a B-TRAN in a power-packet-switching power converter architecture (PPSA), under 200 A and 25° C.

FIG. 16 simulates turnoff of a B-TRAN in a power-packet-switching power converter architecture (PPSA), under 200 A and 25° C. Collector current $I_C$ generally decreases (with several aperiodic positive spikes) from roughly 150 A to a steady-state current of 0 A over the course of ~1 µs. Collector voltage $V_C$ meanwhile begins increasing linearly from 0 V to ~650 V over the course of ~5 µs. Energy dissipated in this transition, due to instants when nonzero current flows at nonzero voltage, is 0.7 mJ.

Figure 17:
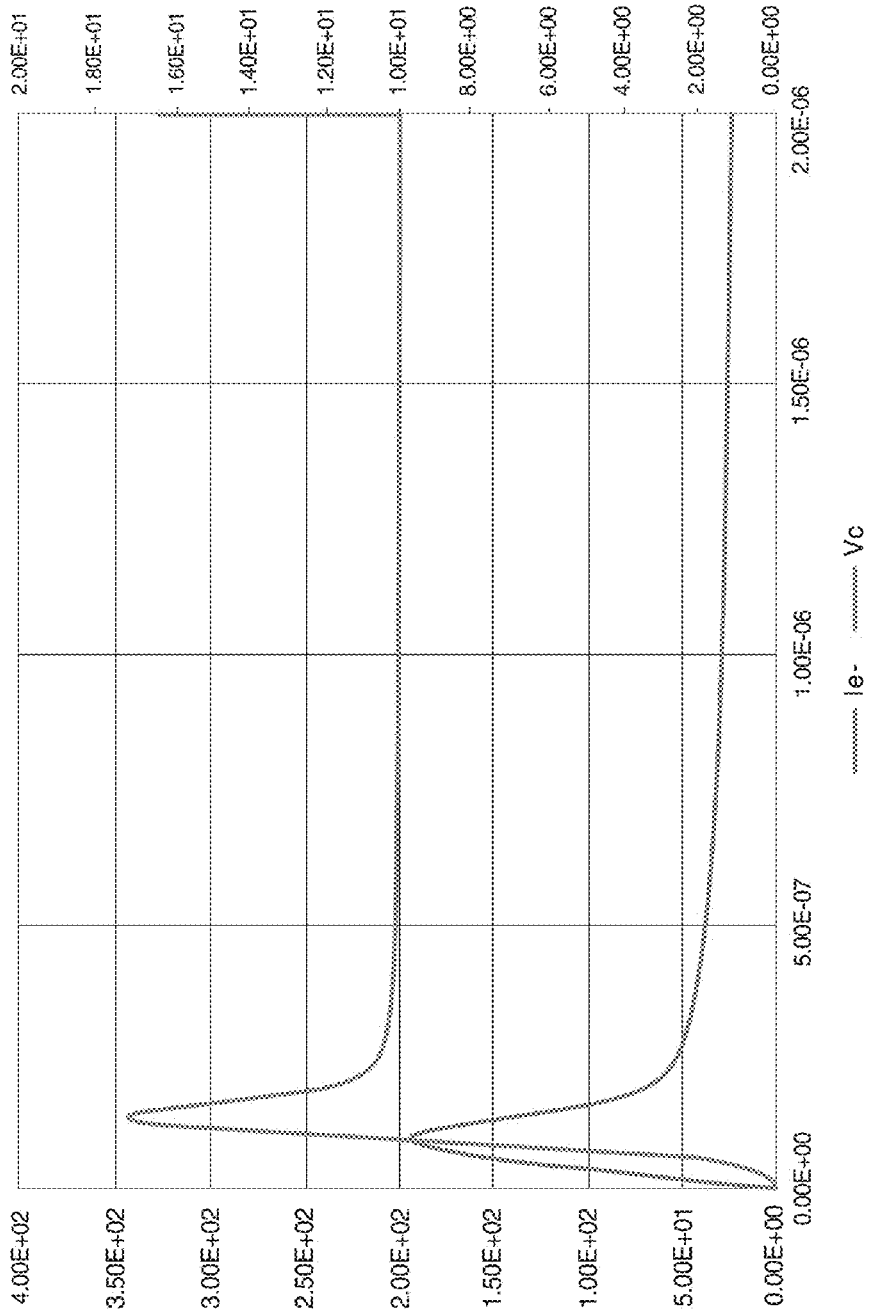
FIG. 17 shows simulated emitter current $I_e$ and collector voltage $V_C$ for a B-TRAN used in PPSA turn-on for 200 A at 25° C.

FIG. 17 shows simulated emitter current $I_e$ and collector voltage $V_C$ for a B-TRAN used in PPSA turn-on for 200 A at 25° C. From time t=0 s, emitter current $I_E$ increases to a peak of ~350 A after roughly 150 ns, then near-asymptotically approaches 200 A until about t=2 µs. Collector voltage $V_C$ rises to a maximum of about 10 V at ~t=100 ns, roughly the same time as emitter current $I_E$ crosses 200 A, then decays to ~1 V by about t=2 µs. Energy dissipated in this transition is 0.4 mJ.

Figure 18:
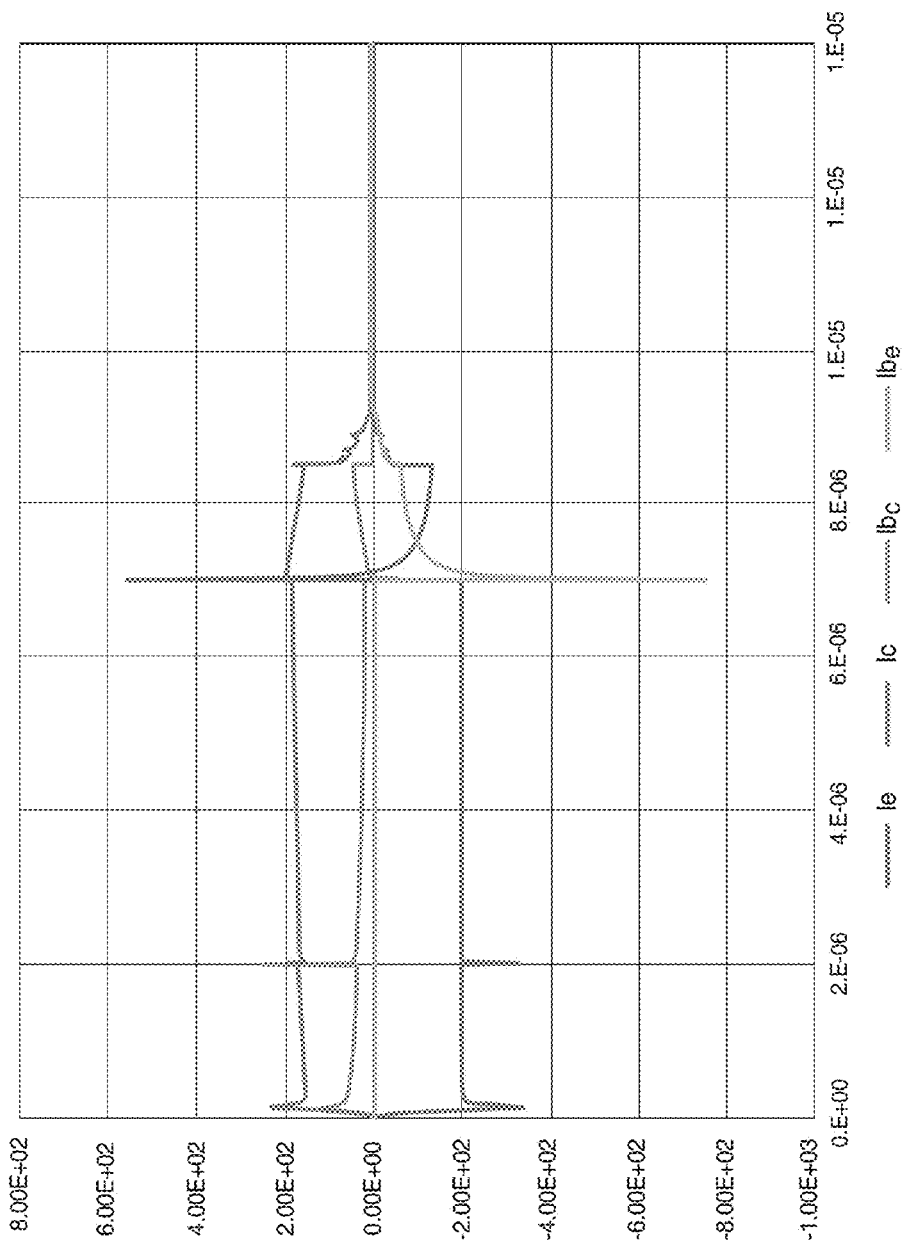
FIG. 18 shows simulated currents for a B-TRAN in use in a PPSA converter for 200 A at 25° C., with a gain of 11 for a 1.5 cm$^2$ B-TRAN with a current density of 133 A/cm$^2$.

FIG. 18 shows simulated currents for a B-TRAN in use in a PPSA converter for 200 A at 25° C., with a gain of 11 for a 1.5 cm$^2$ B-TRAN with a current density of 133 A/cm$^2$. Emitter current $I_E$ spikes to about −350 A at ~t=10 ns, then remains at a steady-state current of −200 A (with a brief spike to −350 A at t=2 µs) until t=7 µs, at which point it spikes sharply to ~+550 A, drops rapidly back to −150 A by t~8.5 µs, then reaches zero (after several aperiodic negative spikes) by t=9 µs.

Collector current $I_C$ spikes to just over 200 A at t~10 ns, then drops back below 200 A and gradually increases (with a brief spike at t=2 µs) to just under 200 A at t=7 µs, at which point it spikes momentarily to 300 A, decreases from 200 A to ~180 A by t=8.5 µs, then reaches zero (after several aperiodic positive spikes) by t=9 µs.

Collector-base current $I_{B-C}$ spikes to ~100 A at t~10 ns, decreases gradually (with a momentary spike to just over 200 A at t=2 µs) to ~0.3 A at 7 µs, spikes momentarily to −20 A, increases gradually to ~0.5 A at 8.5 µs, then drops sharply to zero by t=9 µs.

Emitter-base current $I_{B-E}$ remains at 0 A until t=7 µs, spikes sharply to −750 A, decays to about −50 A by t=8.5 µs, then decays more sharply and reaches zero at t=9 µs.

Figure 19:
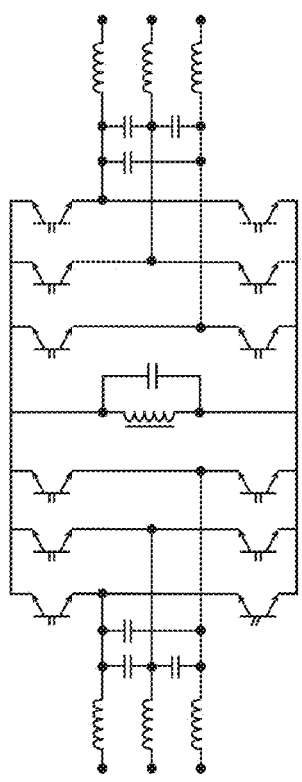
FIG. 19 shows a power-packet-switching architecture (PPSA) power converter using twelve B-TRANs as bidirectional switches.

FIG. 19 shows a power-packet-switching architecture (PPSA) power converter using twelve B-TRANs as bidirectional switches. The PPSA converter runs at 30 kW, 480 VAC, and 14 kHz, with a link frequency of 7 kHz. Each of the twelve B-TRANs is 1.5 cm$^2$. With the twelve B-TRANs, the converter loses 30 W to switching loss, 40 W to conduction loss, and 10 W for base driving of the B-TRANs. With just 80 W operating loss, the converter only experiences 0.26% loss, for 99.74% total efficiency. By comparison, if B-TRANs are not used for bidirectional switching, the twelve B-TRANs must be replaced by 24 IGBTs and 24 diodes. In this scenario, the converter loses 280 W to switching loss, 900 W to conduction loss, and 2 W to gate drive. With 1182 W of total loss, the converter experiences 4% losses, for only 96% efficiency.

Figure 20:
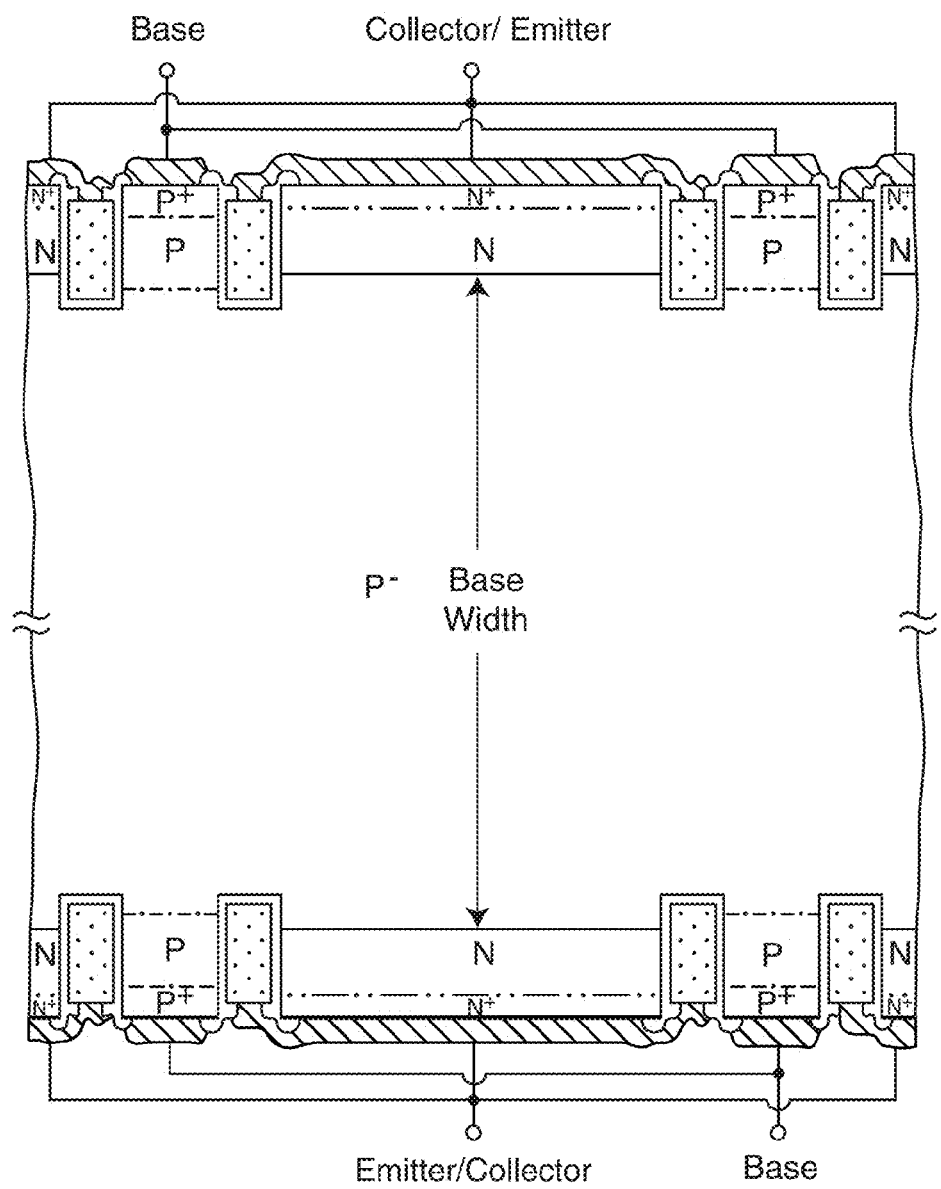
FIG. 20 shows one presently-preferred embodiment of an NPN B-TRAN similar to the one simulated above, with trench field plates separating each emitter/collector region from adjacent base contact regions.

FIG. 20 shows one presently-preferred embodiment of an NPN B-TRAN similar to the one simulated above, with trench field plates separating each emitter/collector region from adjacent base contact regions.

FIGS. 21-28 show a sequence of operation for a single phase leg. In this example two NPN BTRANs 1101 and 1102 are connected to drive an inductive load. The sequence of operation will now be described.

Figure 21:
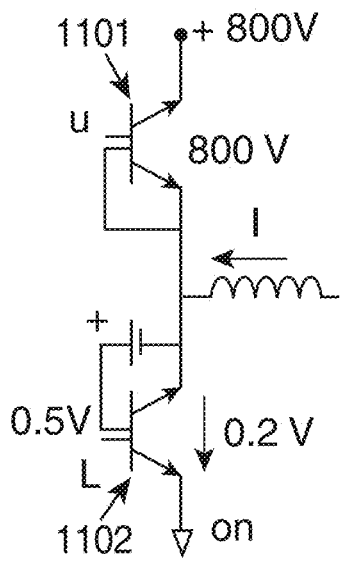
FIGS. 21-28 show a sequence of operation for a single phase leg.

Initially, as shown in FIG. 21, the lower device 1102 is in the ACTIVE-ON state, with a forward voltage of about 0.2V. The collector-side base is at about 0.5V.

Figure 22:
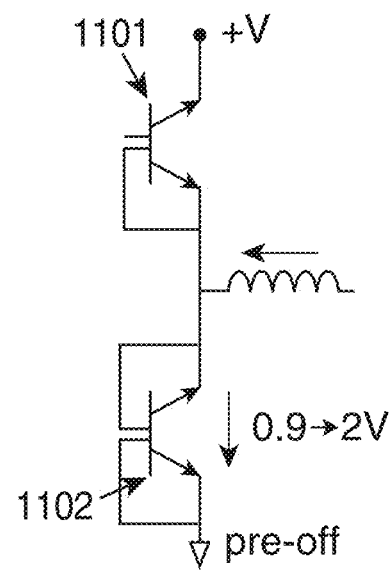

Next, as shown in FIG. 22, the lower device 1102 is placed into the pre-turnoff mode, with both emitter-base junctions shorted. The voltage across lower device 1102 will jump to about 0.9V, and then ramp up to 3V or so. The upper device 1101 still has one emitter-base junction shorted.

Figure 23:
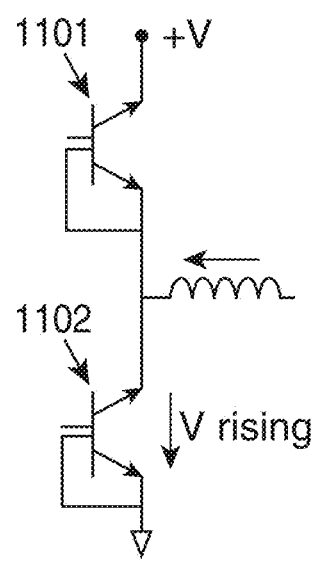

Next, as shown in FIG. 23, the lower device 1102 is driven into the active-OFF mode. This corresponds to times from 8.0 to 8.16 microseconds in FIG. 13.

Figure 24:
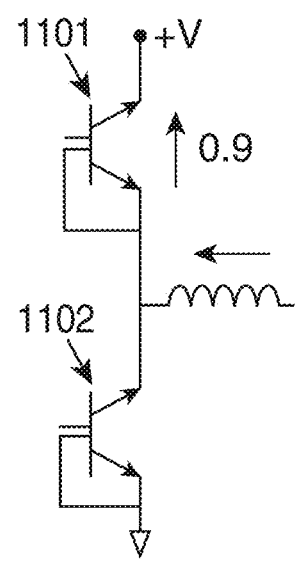

As shown in FIG. 24, the lower device's turnoff puts the top device 1101 into diode conduction. The voltage drop across the top device is about 0.9V.

Figure 25:
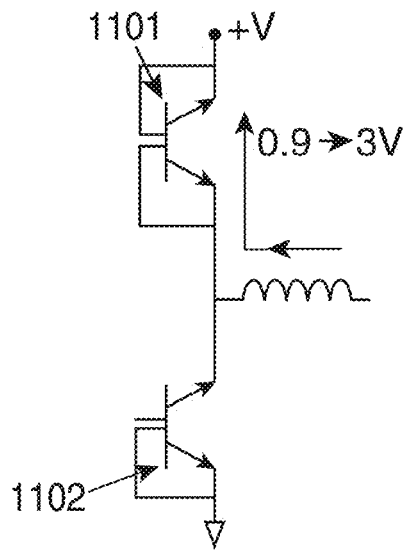

Next, as shown in FIG. 25, the top device 1101 is put into preturnoff, and its 0.9V voltage drop rises to about 3V.

Figure 26:
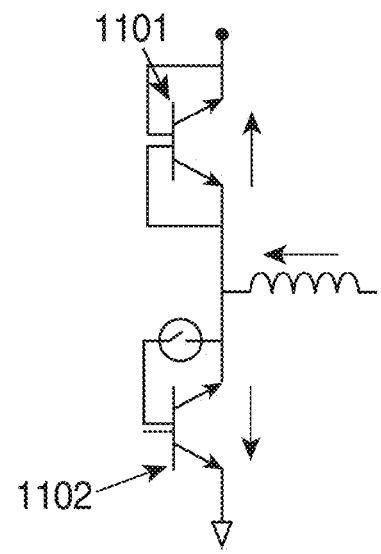

Next, as shown in FIG. 26, the emitter-side base of lower device 1102 is opened, and drive current is applied to the collector-side base. At this point the inductor's current is split between the two BTRANs 1101 and 1102. This corresponds generally to time t=5 in FIG. 15.

Figure 27:
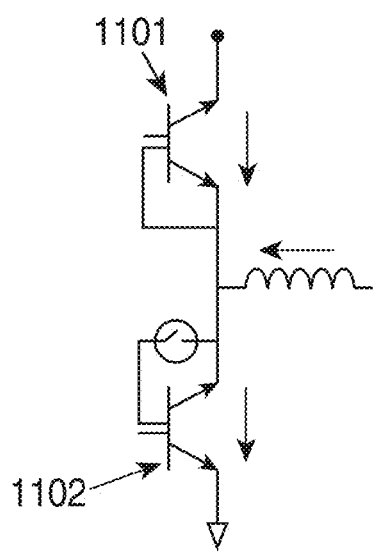

The next stage, as shown in FIG. 27, corresponds generally to time t=5.3 in FIG. 15. Current passes through zero, and the top device is placed into the active-OFF mode. At this point the current on top device 1101 reverses briefly.

Figure 28:
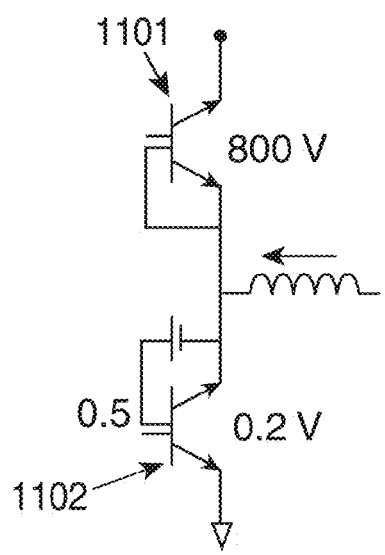

Next, as shown in FIG. 28, the current on the top device goes back to zero. At this point the total voltage blocked begins to rise.

The above explanation, and the accompanying Figures, help to show the surprising advantages of the BTRAN device, especially when operated as described above.

The present application also describes several system configurations, in which the characteristics of the BTRAN device are used to great synergistic advantage in several application environments.

Figure 29:
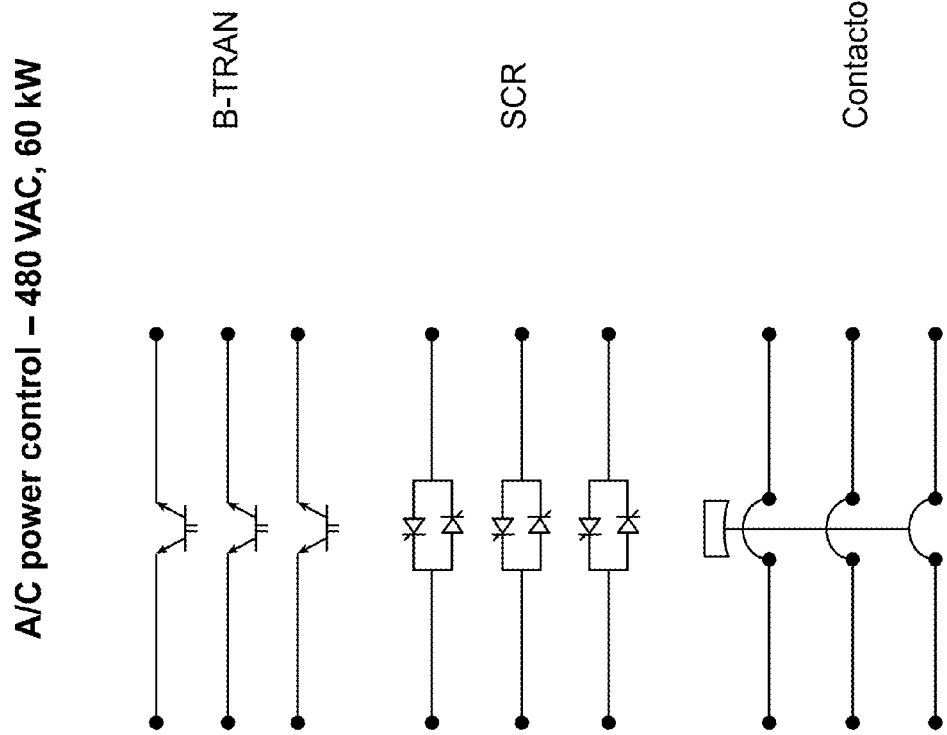
FIG. 29 shows how B-TRANs can be used advantageously in the field of AC power control.

FIG. 29 shows how B-TRANs can be used advantageously in the field of AC power control. When three B-TRANs, each with a 1.5 cm$^2$ die, are used for AC power control in a 480 VAC 60 kWh application, 40 W is lost to dissipation, and the B-TRANs provide current limiting and intra-cycle shut-off capabilities. If instead silicon-controlled rectifiers are used, the three B-TRANs are replaced by six SCRs, with 280 W losses and no current-limiting capabilities. If the three B-TRANs are instead replaced by a contactor, no current limiting is provided, and there is only limited cycling capability.

Figure 30:
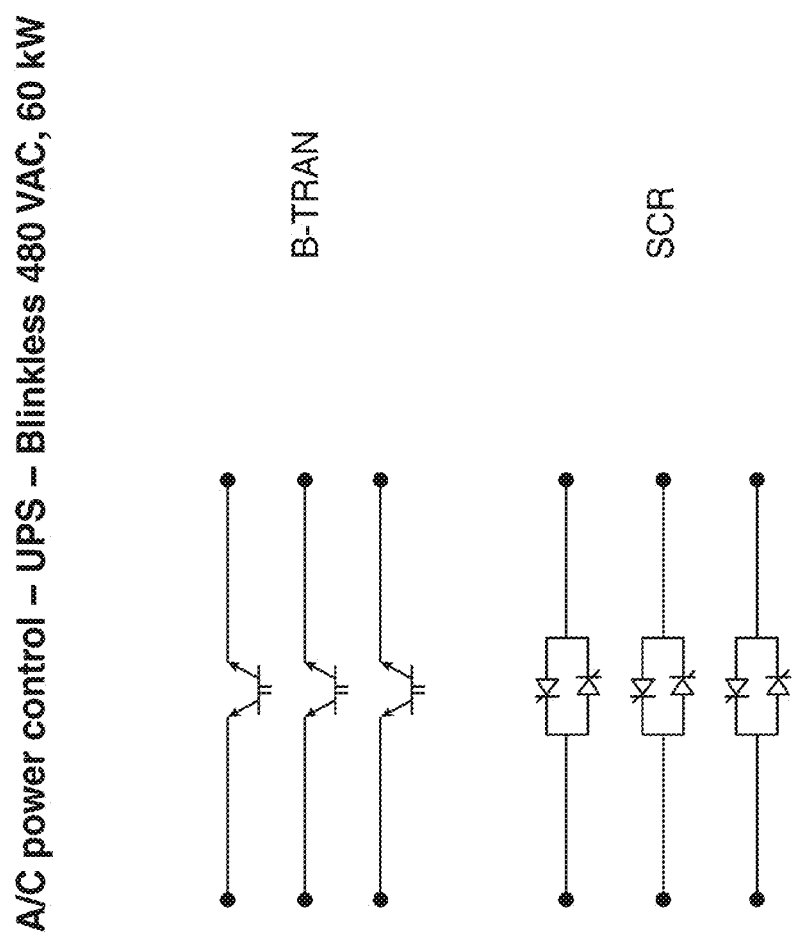
FIG. 30 shows how B-TRANs can advantageously be used for a blinkless universal power supply (UPS).

FIG. 30 shows how B-TRANs can advantageously be used for a blinkless universal power supply (UPS). A 480 VAC 60 kW example thereof using three B-TRANs loses only 40 W to dissipation, and provides current-limiting and intra-cycle shut-off capabilities. If instead six SCRs are used, the dissipation losses increase to 280 W, and no current-limiting capabilities are provided.

Figure 31:
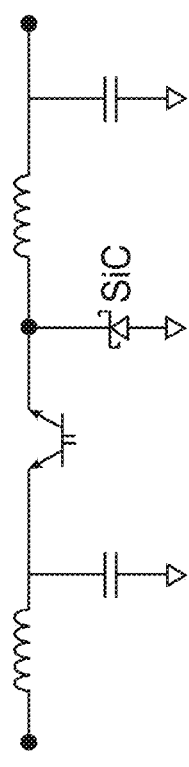
FIG. 31 shows how B-TRANs can be advantageously used in DC-DC Buck converters.

FIG. 31 shows how B-TRANs can be advantageously used in DC-DC Buck converters. For an 800 V, 100 A, 5 kHz, 80 kW DC-DC Buck converter using a 1.5 cm$^2$ B-TRAN, the converter loses 20 W to switching losses, 20 W to conduction losses, and 4 W to base drive. With only 84 W lost, the converter experiences only 0.07% loss. If the same converter instead uses a TO-264 IGBT, the converter loses 110 W to switching loss, 170 W to conduction loss, and 0.5 W to gate drive. With 285 W lost, the converter instead experiences 0.35% total loss.

Figure 32:
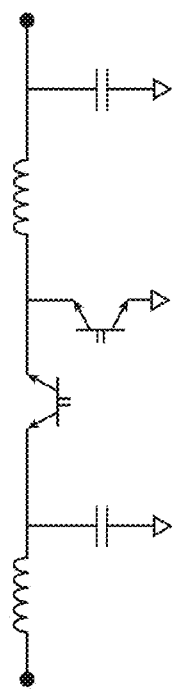
FIG. 32 shows how B-TRANs can also be used advantageously in AC Buck voltage controllers.

FIG. 32 shows how B-TRANs can also be used advantageously in AC Buck voltage controllers. For a low-harmonic, 480 VAC, 60 kW, 5 kHz AC Buck voltage controller, the schematic shown can be used on each of three phases. When a total of six B-TRANs are used as shown, the controller loses 50 W to switching loss, 40 W to conduction loss, and 10 W to base drive, for a total of 100 W lost, or 0.17% loss. This can be used on all distribution to 480/208 VAC transformers to provide constant voltage output. If instead each B-TRAN is replaced by two IGBTs and two diodes, the twelve IGBTs and twelve diodes lead to 200 W of switching loss, 600 W of conduction loss, and 2 W of gate drive, for a total of 802 W or 1.33% total loss.

Figure 33:
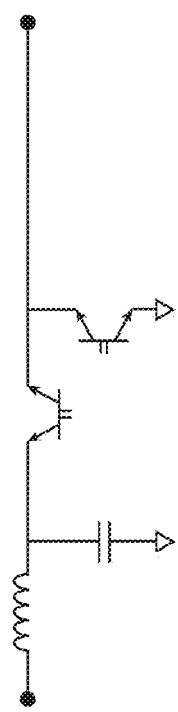
FIG. 33 shows how B-TRANs can be used in motor voltage controllers, and can be used on all induction motors to improve efficiency.

FIG. 33 shows how B-TRANs can be used in motor voltage controllers, and can be used on all induction motors to improve efficiency. When six B-TRANs are used as shown for a 480 VAC, 5 kHz, 60 hp, low harmonic motor voltage controller, the controller sees 50 W of switching loss, 40 W of conduction loss, and 10 W of base drive, for a total of 100 W or 0.17% loss. When the six B-TRANs are instead replaced by twelve IGBT/diode pairs, the controller sees 200 W of switching loss, 600 W of conduction loss, and 2 W of gate drive, for a total of 802 W or 1.33% loss.

Figure 34:
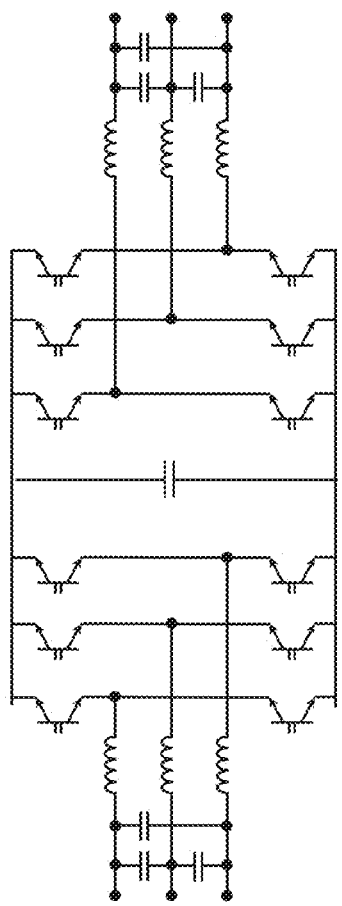
FIG. 34 shows how B-TRANs can be used in regenerative variable-frequency drives (VFDs).

FIG. 34 shows how B-TRANs can be used in regenerative variable-frequency drives (VFDs). In a two-level, 50 A, 5 kHz, 30 hp regenerative VFD, if twelve 1.5 cm$^2$ B-TRANs are used, the regenerative VFD sees 140 W of switching loss, 40 W of conduction loss, and 5 W for base drive, for a total of 185 W or 0.81% loss. If instead twenty-four IGBT/diode pairs replace the twelve B-TRANs, the regenerative VFD sees 160 W of switching loss, 400 W of conduction loss, and 2 W for gate drive, for a total of 562 W or 2.4% loss.

Figure 35:
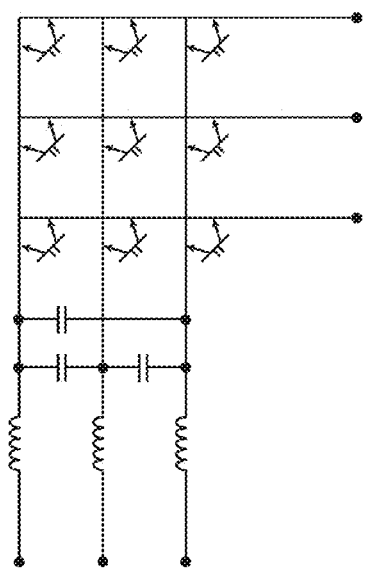
FIG. 35 shows how B-TRANs can be used for matrix converter variable-frequency drives (VFDs).

FIG. 35 shows how B-TRANs can be used for matrix converter variable-frequency drives (VFDs). Matrix converter VFDs are not presently used, as no suitable AC switch was available until the B-TRAN. This could be used on all induction motors to optimize efficiency and provide for variable speed, which requires a custom inverter-grade motor. When nine 0.75 cm$^2$ B-TRANs are used in a 480 VAC, 5 kHz, 30 hp matrix converter VFD, the VFD sees 65 W of switching loss, 20 W of conduction loss, and 5 W for base drive, for a total of 90 W or 0.4% loss. If instead each B-TRAN is replaced by two IGBT/diode pairs, the eighteen IGBT/diode pairs lead to 75 W of switching loss, 400 W of conduction loss, and 1 W for gate drive, for a total of 476 W or 2.0% loss.

According to some but not all disclosed implementations and teachings, there is provided: a power conversion system, comprising: a power-packet-switching-architecture power converter, having, in each of multiple phase legs at both first and second ports, a plurality of four-terminal symmetrically bidirectional bipolar junction transistors; and a first cutoff switch comprising multiple four-terminal symmetrically bidirectional bipolar junction transistors connected to selectably interrupt all connection to the power converter through the first port, and a second cutoff switch comprising multiple four-terminal symmetrically bidirectional bipolar junction transistors connected to selectably interrupt all connection to the power converter through the second port; wherein the transistors of the phase legs of the first port are matched to, and are controlled synchronously with, the transistors of the first cutoff switch; and wherein the transistors of the phase legs of the second port are matched to, and are controlled synchronously with, the transistors of the second cutoff switch.

According to some but not all disclosed implementations and teachings, there is provided: a power conversion system, comprising: a power-packet-switching-architecture power converter, having, in each of multiple phase legs at both first and second ports, a plurality of four-terminal symmetrically bidirectional bipolar junction transistors; and a first cutoff switch comprising multiple four-terminal symmetrically bidirectional bipolar junction transistors connected to selectably interrupt all connection to the power converter through the first port, and a second cutoff switch comprising multiple four-terminal symmetrically bidirectional bipolar junction transistors connected to selectably interrupt all connection to the power converter through the second port; wherein the transistors of the phase legs of the first port are controlled synchronously with the transistors of the first cutoff switch; and wherein the transistors of the phase legs of the second port are controlled synchronously with the transistors of the second cutoff switch.

According to some but not all disclosed implementations and teachings, there is provided: a power system, comprising: first and second AC-capable power input connections; at least one AC-capable power output connection; first and second four-terminal symmetrically bidirectional bipolar junction transistors, connected between the power output connection and the first and second power input connections respectively; and control circuitry which, when the first power input connections stops receiving power while the first transistor is ON, a) begins turn-on of the second transistor in diode mode, and b) contemporaneously with substep a), puts the first transistor into pre-turnoff mode, and c) after substep a), applies base drive to the first transistor, and d) after substep b), turns the second transistor totally off.

According to some but not all disclosed implementations and teachings, there is provided: a power system, comprising: first and second AC power input connections; at least one AC power output connection; first and second four-terminal double-base symmetrically bidirectional bipolar junction transistors, connected between the power output connection and the first and second power input connections respectively; and control circuitry which, when the first power input connections stops receiving power while the first transistor is ON, begins to turn the second transistor ON without floating the power output, and contemporaneously begins to turn the first transistor OFF.

According to some but not all disclosed implementations and teachings, there is provided: a power system, comprising: first and second power-packet-switching-architecture power converters, connected in series between first and second AC power connections; a battery connected to a common node between the first and second power converters, directly or through a cutoff switch; a local power source, connected to a port on one of the power converters; and control circuitry connected to operate the first and second power converters jointly, to thereby provide power to the second AC power connection, as needed, from the battery or the local power source or the first AC power connection, and to provide power to the battery selectably from the first power connection or the local power source.

According to some but not all disclosed implementations and teachings, there are provided: methods and systems for smart transfer switch circuits and operation, and for operation of transfer and/or cutoff switches in combination with a power-packet-switching-architecture (PPSA) power converter. The transistors of the transfer and cutoff switches, and the transistors of the phase legs of the PPSA power converter if present, preferably all use double-base bipolar transistors which have low on-state series resistance as the switching elements.

Advantages

The disclosed innovations, in various embodiments and combinations, provide one or more of at least the following advantages. However, not all of these advantages result from every one of the innovations disclosed, and this list of advantages does not limit the various claimed inventions.

Improved efficiency in power switching systems and methods;

Transfer switches with more complex connectivities are easily implemented.

Avoidance of break-before-make requirement means less chance of transients appearing unexpectedly.

Modifications And Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

For one example, the switching transistor can be part of a merged device structure, as taught in e.g. Ser. Nos. 14/918,440 and 62/236,415, both of which are hereby incorporated by reference in their entireties.

For another example, in subsystems (like those of FIGS. 3A-10) which include both a PPSA power converter and external B-TRAN switches, control of the external B-TRAN switches can be done synchronously with control of the phase leg switches in the PPSA converter.

Further, in systems where external B-TRAN switches are used to expand one port of a PPSA (as e.g. in FIGS. 8-10), it is particularly advantageous to control the external switches synchronously with the B-TRAN switches of the PPSA. The fast turn-ON and turn-OFF of the B-TRAN devices is particularly advantageous with this combination, and synchronous operation of matched devices helps to reap the benefits of this synergy.

It should also be noted that PPSA converters with transformer coupling can be used as well as converters with a single link inductor.

It should also be noted that, while the examples shown generally use three-phase connections, the disclosed inventions can also be implemented in split-phase (two-phase), three-phase plus active neutral, or other phase leg configurations.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

Those of ordinary skill in the relevant fields of art will recognize that other inventive concepts may also be directly or inferentially disclosed in the foregoing. NO inventions are disclaimed. The claims as filed are intended to be as comprehensive as possible, but NO disclosed novel subject matter is intentionally relinquished, dedicated, or abandoned.

What is claimed is:

1. A method for power conversion, comprising:
    operating a power-packet-switching-architecture power converter which has, in each of multiple phase legs at both first and second ports, a plurality of four-terminal symmetrically bidirectional bipolar junction transistors, to provide power transfer between the first and second ports, with conversion of voltage, current, phase, and/or frequency as selected; and
    using a first cutoff switch comprising multiple four-terminal symmetrically bidirectional bipolar junction transistors connected to selectably interrupt all connection to the power converter through the first port, and a second cutoff switch comprising multiple four-terminal symmetrically bidirectional bipolar junction transistors connected to selectably interrupt all connection to the power converter through the second port;
    wherein the transistors of the phase legs of the first port are matched to, and are controlled synchronously with, the transistors of the first cutoff switch;
    and wherein the transistors of the phase legs of the second port are matched to, and are controlled synchronously with, the transistors of the second cutoff switch.

2. The method of claim 1, wherein the converter includes a link transformer, and wherein the first and second ports are connected to different sides of the link transformer, and wherein the transistors of the first cutoff switch are not matched to the transistors of the second cutoff switch.

3. The method of claim 1, wherein the converter includes a single link inductor which is not a transformer, and wherein the transistors of the first cutoff switch are matched to the transistors of the second cutoff switch.

4. The method of claim 1, wherein each port of the converter includes at least three distinct lines, which are separately connected through distinct transistors of the corresponding switch.

* * * * *